US009794667B2

(12) United States Patent
Schreiber et al.

(10) Patent No.: US 9,794,667 B2
(45) Date of Patent: *Oct. 17, 2017

(54) HANG UP MAGNET FOR RADIO MICROPHONE

(71) Applicant: Innovative Products Inc., Knoxville, TN (US)

(72) Inventors: Bryan J. Schreiber, Knoxville, TN (US); Michael J. Tinter, Hudson, OH (US)

(73) Assignee: Innovative Products Inc., Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/179,043

(22) Filed: Jun. 10, 2016

(65) Prior Publication Data
US 2016/0286294 A1 Sep. 29, 2016

Related U.S. Application Data

(63) Continuation-in-part of application No. 13/548,736, filed on Jul. 13, 2012, now Pat. No. 9,369,790, which is a continuation-in-part of application No. 12/542,145, filed on Aug. 17, 2009, now abandoned.

(60) Provisional application No. 61/089,071, filed on Aug. 15, 2008.

(51) Int. Cl.
*H04R 1/08* (2006.01)
*F16M 13/02* (2006.01)
*F16B 1/00* (2006.01)

(52) U.S. Cl.
CPC .............. *H04R 1/08* (2013.01); *F16M 13/02* (2013.01); *F16B 2001/0035* (2013.01); *H04R 2201/021* (2013.01); *H04R 2499/13* (2013.01)

(58) Field of Classification Search
CPC ....................................................... H04R 1/08
USPC ....................................................... 381/361
See application file for complete search history.

(56) References Cited

U.S. PATENT DOCUMENTS

| | | |
|---|---|---|
| 3,244,981 A | 4/1966 | Der Tatevasian |
| 4,058,357 A | 11/1977 | Wallace |
| 4,319,097 A | 3/1982 | Liataud |
| 5,221,929 A | 6/1993 | Ott |
| 5,605,145 A | 2/1997 | Hannah et al. |
| 6,149,116 A | 11/2000 | Won |
| 6,288,684 B1 | 9/2001 | Wiggenhorn et al. |
| 2004/0132509 A1 | 7/2004 | Glezerman |
| 2004/0232291 A1 | 11/2004 | Carnevali |
| 2007/0093279 A1 | 4/2007 | Janik |
| 2007/0172079 A1 | 7/2007 | Christoph |
| 2008/0164267 A1 | 7/2008 | Huber |
| 2008/0311966 A1 | 12/2008 | Klein |
| 2009/0116678 A1 | 5/2009 | Bevirt et al. |

*Primary Examiner* — Duc Nguyen
*Assistant Examiner* — Phan Le
(74) *Attorney, Agent, or Firm* — Warner Norcross & Judd LLP

(57) ABSTRACT

A system is disclosed for safely and efficiently removing or returning a radio microphone from a mounting surface. The system includes a first magnet attached to the rear side of a radio microphone and a second magnet located at a desired mounting position on the mounting surface. The second magnet preferably includes an outer vinyl layer to prevent breaking or cracking of the first second magnet when returning the radio microphone to its mounting position.

17 Claims, 25 Drawing Sheets

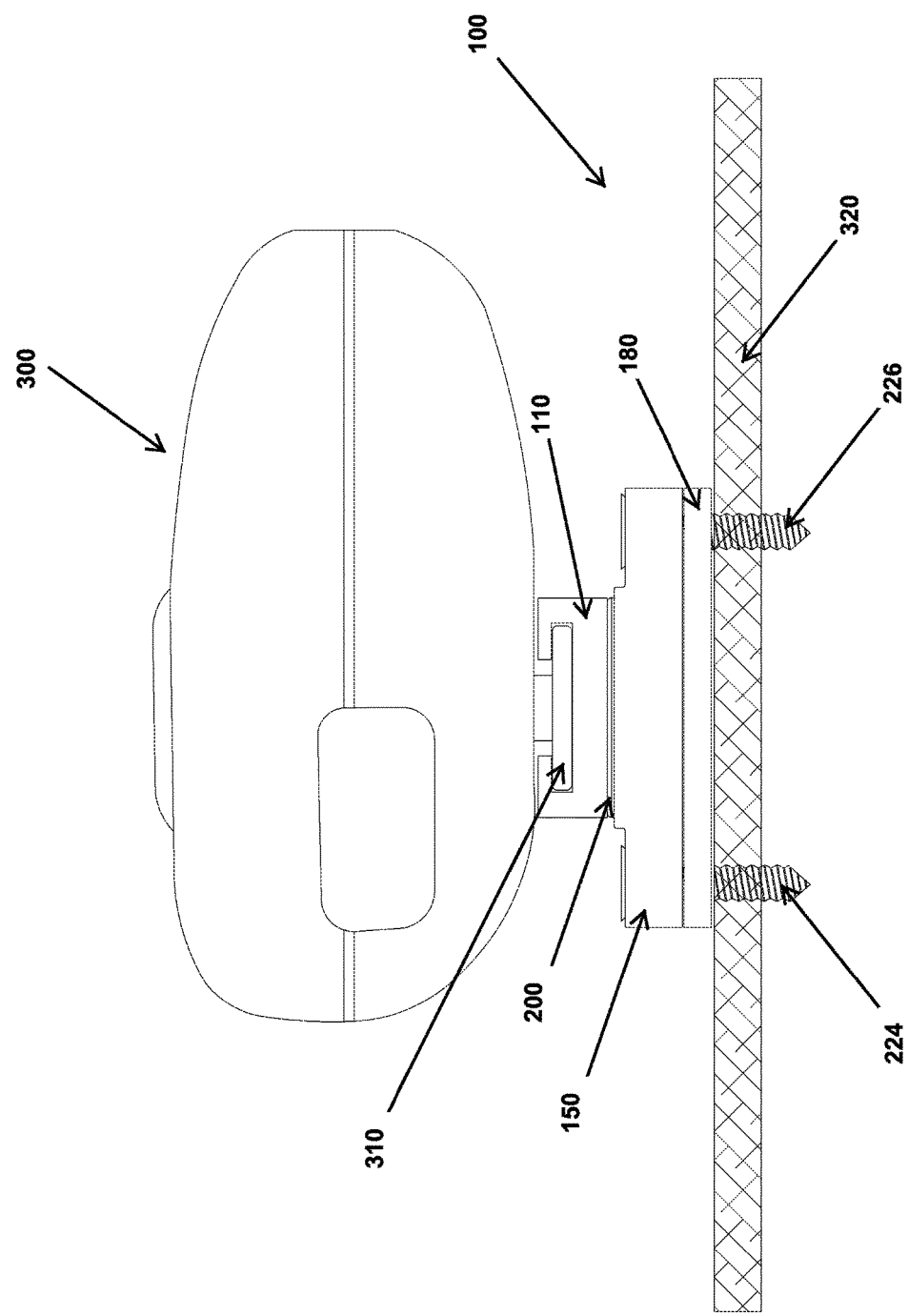

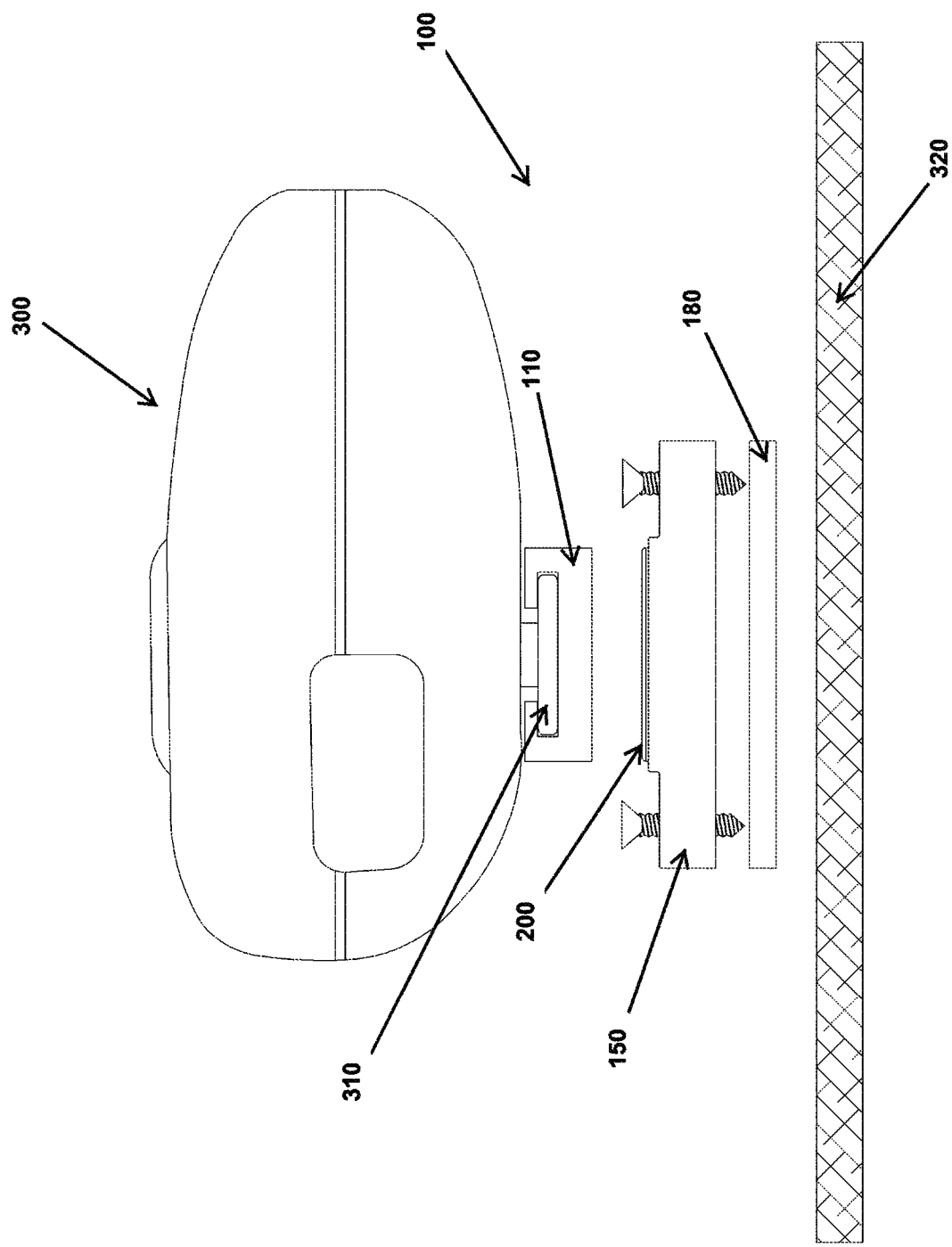

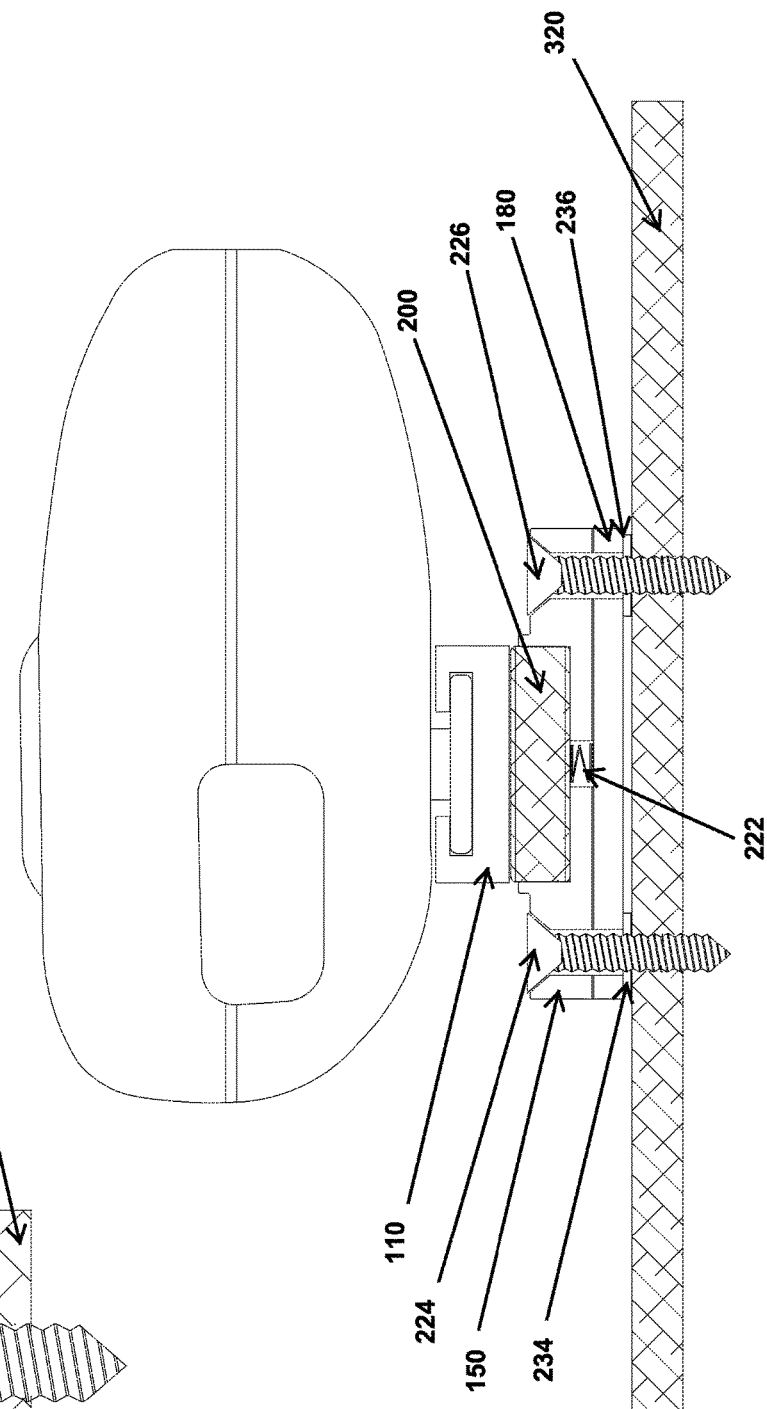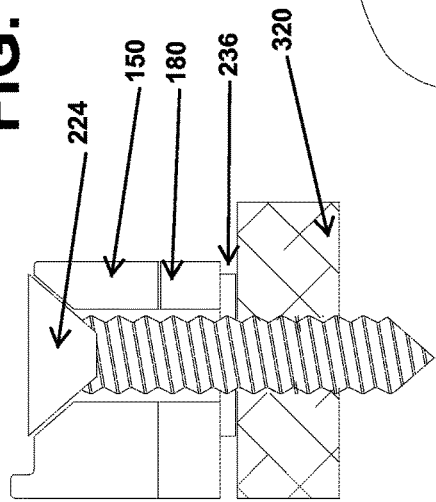

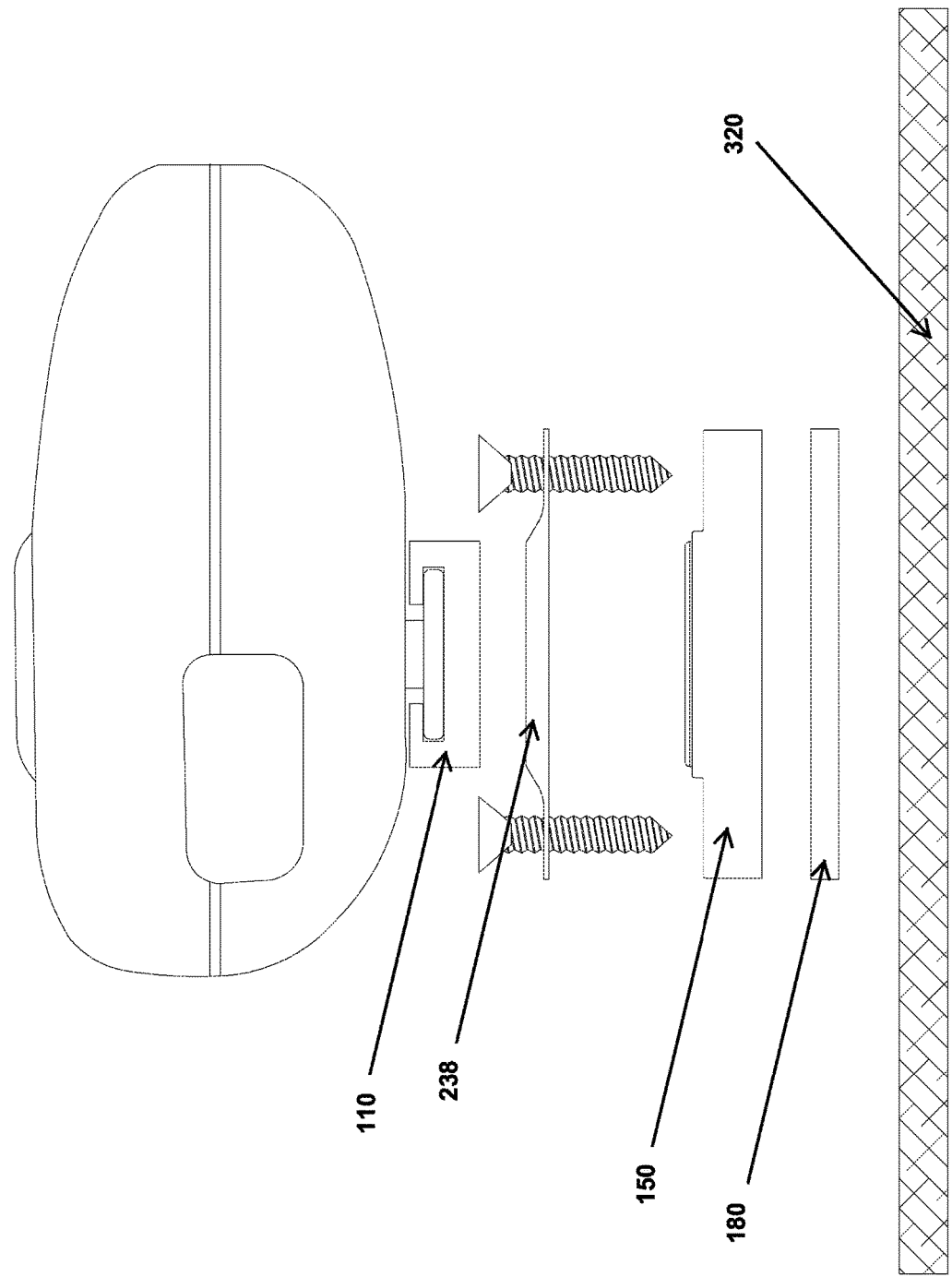

HANG UP MAGNET FOR RADIO MICROPHONE

FIELD

This invention relates to the field of radio microphone devices. More particularly, this invention relates to a system for safely and efficiently removing or returning a radio microphone from its mounting device using magnets.

BACKGROUND

Radio microphones have traditionally been attached to their mounting device in an automobile using a clip assembly. The clip assembly utilizes a tongue and groove attachment. As such, when the radio user wants to remove or replace a radio microphone from the traditional 'hang-up clip' mount, they might find it difficult to locate the precise positioning required to attach the radio microphone to its mounting device. This normally requires them to either waste time trying to remove or replace the microphone or causing them to concentrate on removing or replacing the microphone rather than concentrating on their driving.

What is needed, therefore, is a system for safely and efficiently removing or returning a radio microphone from its mounting device.

SUMMARY

Embodiments of the invention described herein pertain to a magnetized radio microphone mounting system. According to one embodiment of the invention the radio microphone mounting system includes a radio microphone having a rear surface. A magnet is externally attached to the rear surface of the radio microphone for mounting the radio microphone to a magnetically attractable mounting surface. In preferred embodiments, the mounting system includes a second magnet for attaching to the mounting surface and for attracting the magnet attached to the rear surface of the radio microphone, the attraction between the magnets being of sufficient strength for the mounting of the radio microphone to the mounting surface. An external shock absorbent layer may be provided for covering at least one of the magnets for preventing damage to the magnets and the mounting surface. In preferred embodiments, the external shock absorbent layer is vinyl.

According to another embodiment of the invention, the second magnet is disposed within an outer layer of a plastic housing. The plastic housing includes at least one hole for attaching the plastic housing to the mounting surface, and the hole may be elongated for adjusting the height of the plastic housing with respect to the mounting surface. In other embodiments, the magnet attached to the rear surface of the radio microphone may be disposed within a plastic housing.

According to another embodiment of the invention, the radio microphone mounting system includes a first magnet for attaching to a rear surface of a radio microphone and a second magnet for attaching to a mounting surface, the second magnet for attracting the first magnet and the attraction between the first and second magnets being of sufficient strength for the mounting of the radio microphone to the mounting surface. An external shock absorbent layer may be provided for covering at least one of the magnets for preventing damage to the magnets and the mounting surface. In preferred embodiments, the external shock absorbent layer is vinyl.

According to another embodiment of the invention, the radio microphone mounting system includes a radio microphone having a non-magnetic rear surface receptive to magnetic flux and a magnet for attaching to a mounting surface, the magnet for attracting the non-magnetic rear surface of the radio microphone and for mounting the radio microphone to the mounting surface. In preferred embodiments, the non-magnetic rear surface is a metallic material receptive to magnetic flux.

In an alternative aspect, the radio microphone mounting system includes a handset adapter capable of mechanically mounting to the hang-up clip of a handset microphone and a magnetic mounting assembly capable of being mounted to a mounting surface. The mounting assembly of this aspect of the invention is specially configured to provide one or more meaningful improvements. For example, the mounting assembly may be configured to assist in providing appropriate alignment between the adapter and the magnet. As another example, the mounting assembly may be configured to help provide substantially uniform magnetic attraction between the microphone and the mounting assembly despite variations in the environment in which the mounting assembly is mounted. As yet another example, the mounting assembly may be configured to provide electrical conductivity between the magnet and the ground, thereby facilitating proper operation of radios that utilize a microphone grounding function.

In one embodiment, the handset adapter is not a magnet, but is manufactured from a material that is attracted by a magnet, such as a ferromagnetic material, like steel, iron, nickel or cobalt. The adapter may be a generally circular disk and may include a slot-and-groove arrangement that is configured to be slid over a conventional hang-up clip on the rear of the radio microphone. For example, the adapter may be fitted over the tongue in a conventional "tongue-and-groove" hang-up system. The size and shape of the slot-and-groove arrangement may be selected to accommodate hang-up clips of various sizes and shapes, thereby providing an essentially universal adapter. The adapter may include a set screw for securing the adapter to the hang-up clip. In one embodiment, the adapter includes a coaxially disposed set screw for selectively securing the adapter.

In one embodiment, the mounting assembly includes a magnet, a carrier constructed from a material substantially not attractable by a magnet, and a backing plate constructed from a material attractable by a magnet. The magnet may be a rare-earth magnet that is press-fitted into assembly with the carrier. The magnet may be axially polarized to provide the mounting assembly with a larger "landing zone." The carrier may be sufficiently non-magnetic or non-magnetically permeable that it does not communicate sufficient magnetic force to attract the adapter, thereby helping to ensure that the adapter magnetically couples to the magnet and not to the carrier. The carrier may be manufactured from aluminum or from essentially any other material capable of supporting the magnet without communicating sufficient magnet flux to become magnetically attractive to the adapter.

In one embodiment, the backing plate is positioned behind the carrier opposite the magnet. The backing plate is configured to provide a magnetic field flow path that helps to isolate the magnetic field of the magnet from environmental structure—most notably the mounting structure. In the absence of the backing plate, the strength of the magnetic attraction between the adapter and the mounting assembly may vary significantly from application to application depending on the magnetic properties of the mounting structure, such as the vehicle dashboard or center console.

For example, the magnetic attraction between the adapter and the magnet may increase significantly in the absence of the backing plate if the carrier is mounted to a material attractable by a magnet.

In one embodiment, the mounting assembly includes an integrated grounding path configured to allow the radio system to ground when the handset is "parked" on the magnet. The grounding path may include a conductive element disposed between the magnet and a potential ground. In one embodiment, the carrier and the backing plate each include a through hole and the conductive element is an electrically conductive spring that is fitted through the through holes. In use, the spring is compressed between the backside of the magnet and a ground element against which the backing plate is mounted, such as a grounded dashboard or a grounded center console. Alternatively, the conductive element may provide an electrical flow path between the magnet and the backing plate, and the backing plate may be grounded, for example, using a grounding screw or a grounding wire.

The present invention provides a simple and effective conversion that can be sold as an after-market kit that converts an existing radio, public address ("PA") system and/or citizen band ("CB") radio. In one embodiment, the present invention is capable of easily converting a wide-range of systems that utilize a tongue and groove hang-up system into a magnetically attracted hang-up system by installing an adapter to the microphone handset and replacing an existing mechanical mount with a magnetic mounting assembly. The adapter is easily fitted to a hang-up clip on the radio handset with a simple sliding action, and can be securely locked in place using a standard set screw. This simple installation and removal not only facilitates conversion, but allows the adapter to be easily moved from handset to handset, as desired. For example, it is not uncommon for an emergency rescue vehicle to include more than one radio and consequently more than one handset. The vehicle may be used by different operators that have different radio preferences. The mounting system of the present invention is simple and quick enough to allow each operator to move the adapter to the preferred radio when that operator is using the vehicle.

In various embodiments, the present invention provides optimized performance. For example, the features of various embodiments may be combined to provide a system with a large, secure landing zone that firmly holds the handset with a uniform force. The use of a non-magnetic carrier helps to isolate the magnetic attraction to the region of the magnet and not to the surrounding carrier. This helps to ensure a strong and uniform magnetic bond between the handset and the mounting assembly while effectively preventing the handset from being weakly coupled to the carrier by a relatively weak magnetic field that could be communicated through a material attractable by a magnet. The use of a magnetically permeable backing plate helps to control the magnetic field produced by the magnet to reduce the effect of environmental materials on the attractive force of the adapter and magnet. If desired, the characteristics of the adapter, magnet, carrier and backing plate can be selected in combination to provide the desired pull-force.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

Further advantages of the invention are apparent by reference to the detailed description in conjunction with the figures.

FIG. 7 is a side view of a radio microphone mounting system constructed in accordance with one embodiment of the present invention.

FIG. 8 is an exploded side view of the radio microphone mounting system of FIG. 7.

FIG. 32 is a sectional view of the grounding path of FIG. 30.

FIG. 33 is an enlarged sectional view of the grounding path of FIG. 30.

FIG. 34 is a side exploded view of a grounding path.

DETAILED DESCRIPTION

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

Figure 1:
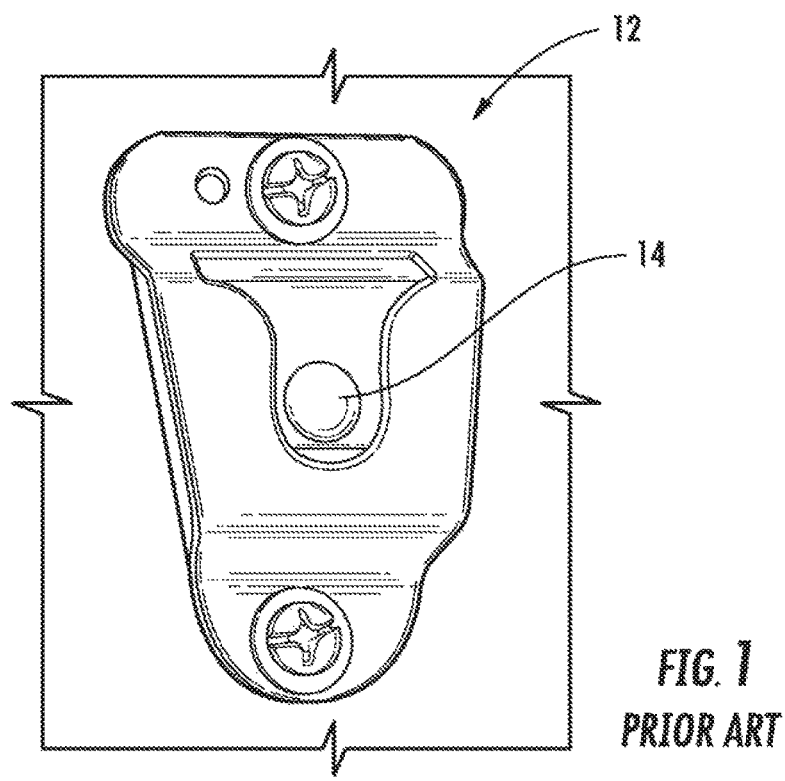
FIG. 1 depicts a traditional hang-up clip assembly for mounting a traditional radio microphone as commonly known in the prior art.
Figure 2:
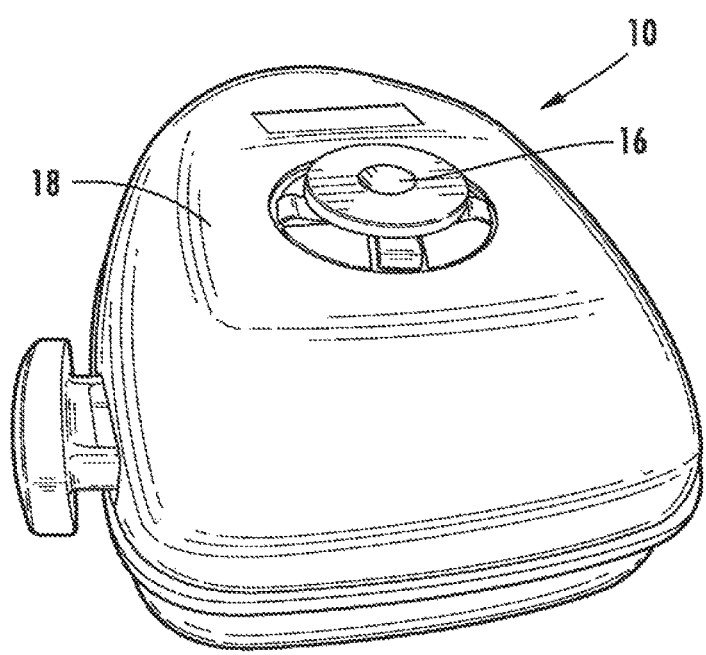
FIG. 2 depicts a tongue assembly attached to the rear end of a radio microphone for mounting upon the traditional hang-up clip assembly of FIG. 1 as commonly known in the prior art.

Shown in FIGS. 1 and 2 is a device well known in the art for attaching a radio microphone 10 to an automobile dashboard or other mounting location using a traditional hang-up clip assembly 12. Referring to FIG. 1, the traditional hang-up clip assembly 12 is a "tongue-and-groove" system that utilizes a metal groove 14 for mounting the radio microphone 10 when the microphone is not being used. As depicted in FIG. 2, a metal tongue 16 is attached to the rear side 18 of the radio microphone 10 for placement in the metal groove 14 when hanging up the radio microphone 10.

Figure 3:
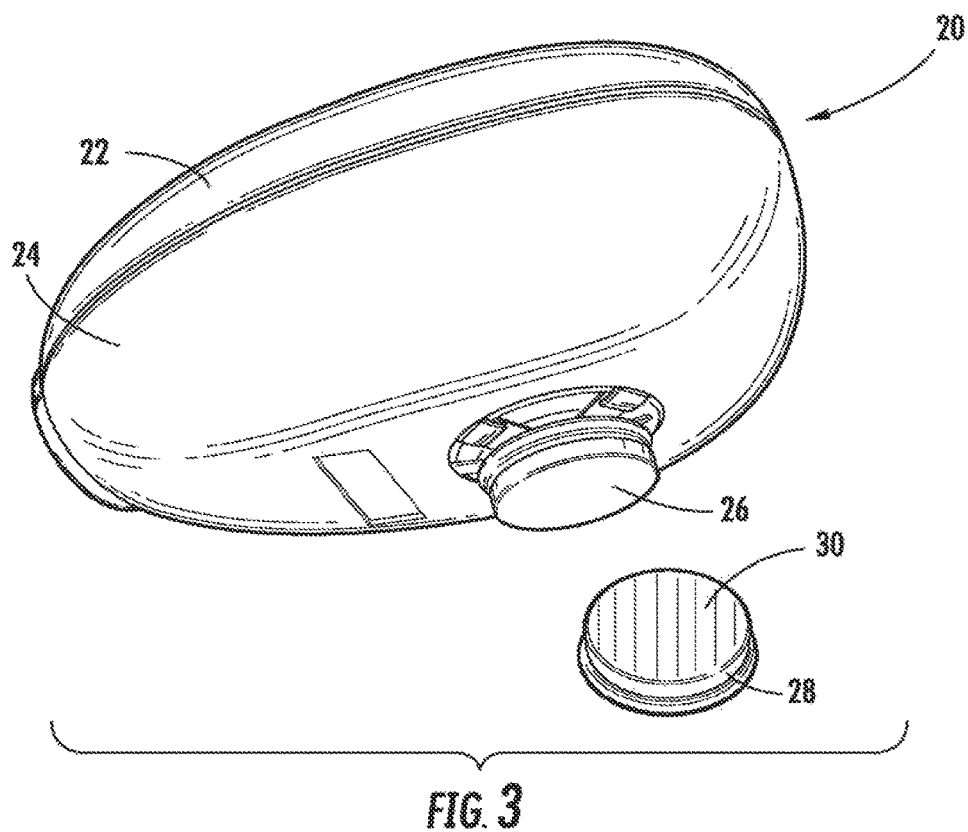
FIG. 3 depicts a magnet attached to the rear surface of a radio microphone according to an embodiment of the invention.
Figure 4:
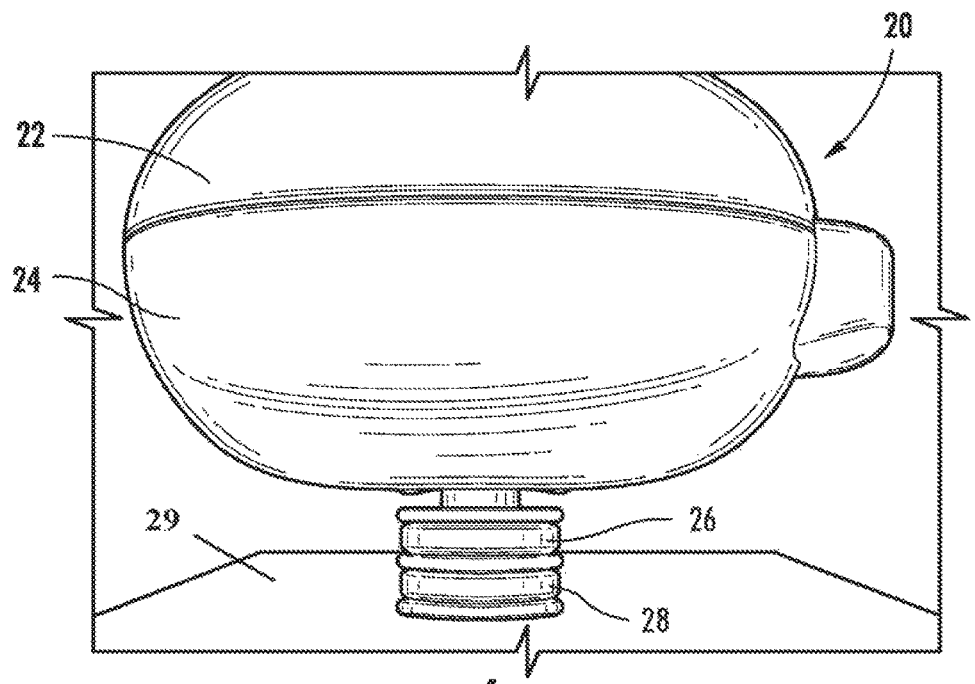
FIG. 4 depicts a magnet attached to the rear surface of the radio microphone and mounted to a second magnet attached to a mounting surface according to an embodiment of the present invention.

A radio microphone 20 according to one embodiment of the present invention is depicted in FIGS. 3 and 4. The radio microphone 20 has a front side 22 and rear side 24, and a first magnet 26 is externally attached to the rear side 24 of the radio microphone 20. The first magnet 26 is of a sufficient strength to attach to a second magnet 28 disposed at a desired location 29, such as the dashboard of an automobile, for mounting the radio microphone 20. Due to the attraction between the first 26 and second magnets 28, a user of the microphone 20 preferably only has to place the rear side 24 of the microphone 20 in the general vicinity of the second magnet 28 for the mounting of the radio microphone 20 to the mounting surface 29. Thus, the user can quickly and efficiently mount the radio microphone 20 after use without taking his eyes off the road, or otherwise diverting his attention from driving, to accurately place the microphone 20 in the traditional clip assembly 12. Furthermore, the user will be able to easily remove the microphone 20 from its mounted location for use by merely pulling on the microphone 20 with enough strength to separate the first 26 and second magnets 28.

The second magnet 28 disposed at the mounting surface 29 may also include an outer vinyl layer 30. The outer vinyl layer 30 acts as a cushion or shock absorber that allows the user to hang up the radio microphone 20 without fear of cracking or breaking either of the first 26 or second magnets 28 when they are pulled together. Alternatively, the first magnet 26, or both the first 26 and second magnets 28, may include an outer vinyl layer 30.

Figure 5:
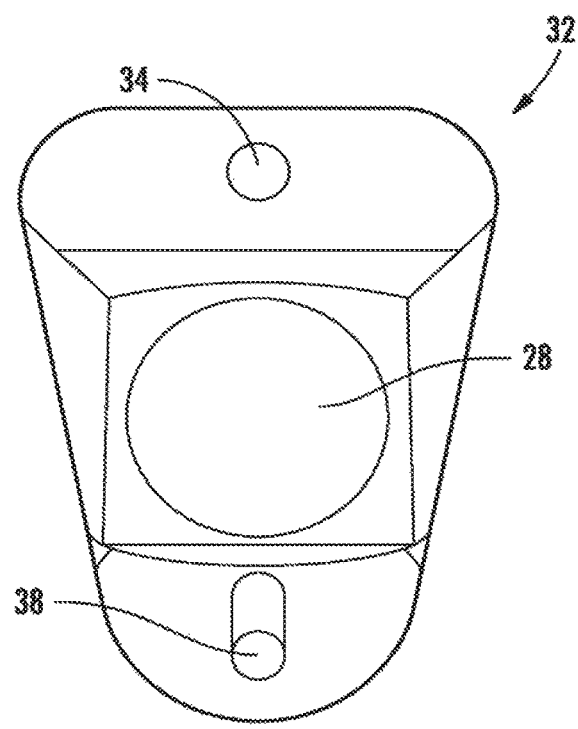
FIG. 5 depicts a plastic housing for mounting second magnet to the microphone mounting surface.
Figure 6:
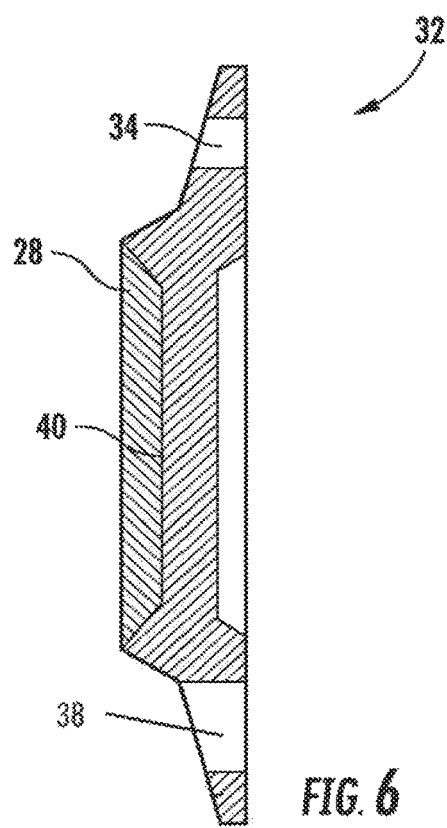
FIG. 6 is a right side view of the plastic housing depicted in FIG. 5.
Figure 10:
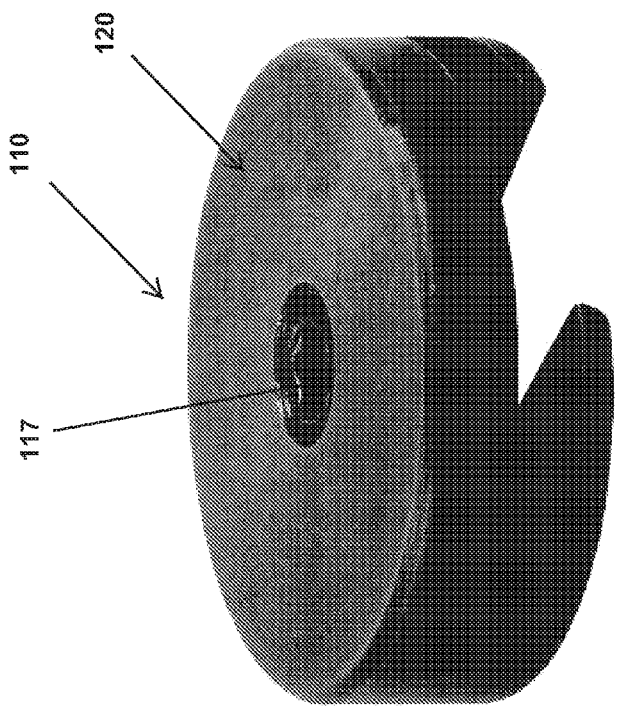
FIG. 10 is a bottom perspective view of the handset adapter of FIG. 7.
Figure 9:
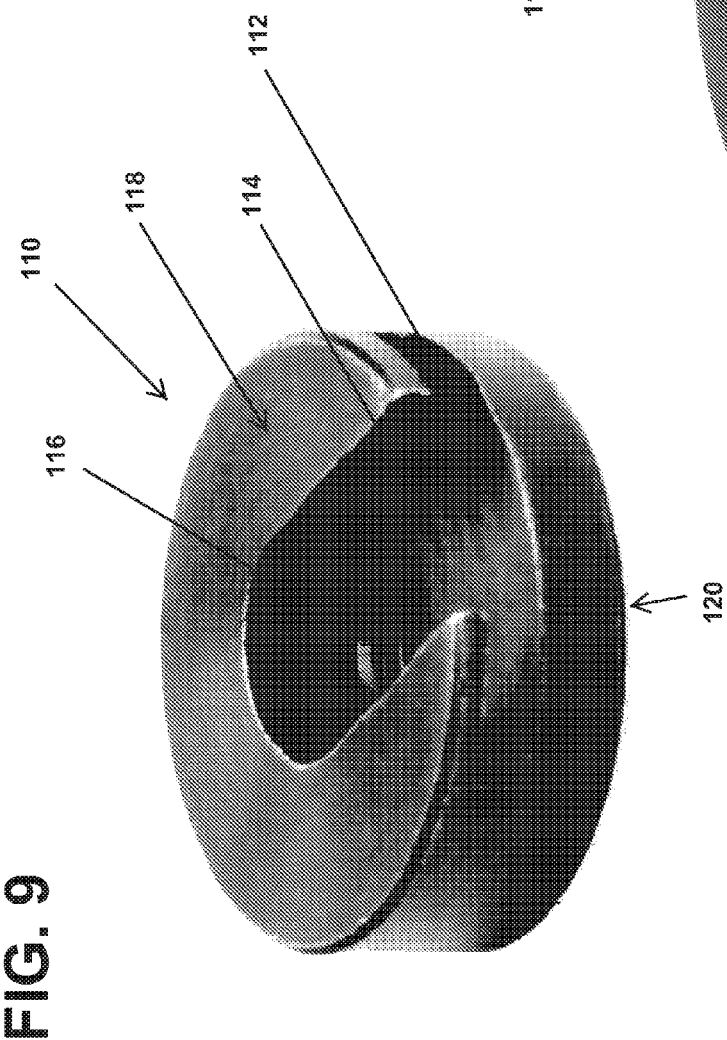
FIG. 9 is a top perspective view of a handset adapter in accordance with an embodiment of the invention.
Figure 13:
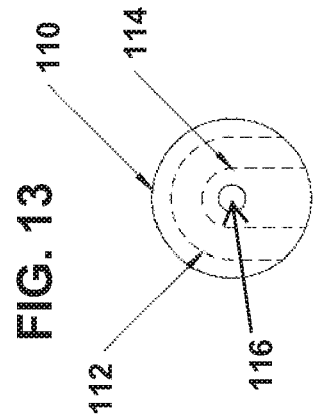
FIG. 13 is a top view of the handset adapter of FIG. 7.
Figure 14:
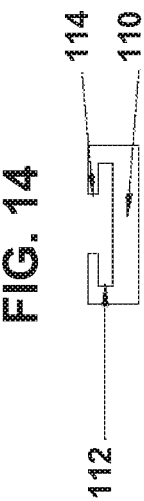
FIG. 14 is a side view of the handset adapter of FIG. 7.
Figure 11:
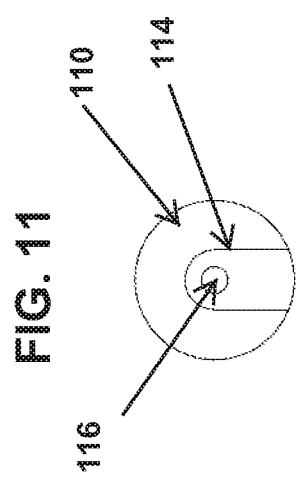
FIG. 11 is a top view of the handset adapter of FIG. 7.
Figure 12:
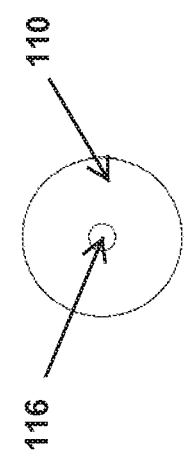
FIG. 12 is a bottom view of the handset adapter of FIG. 7.
Figure 15:
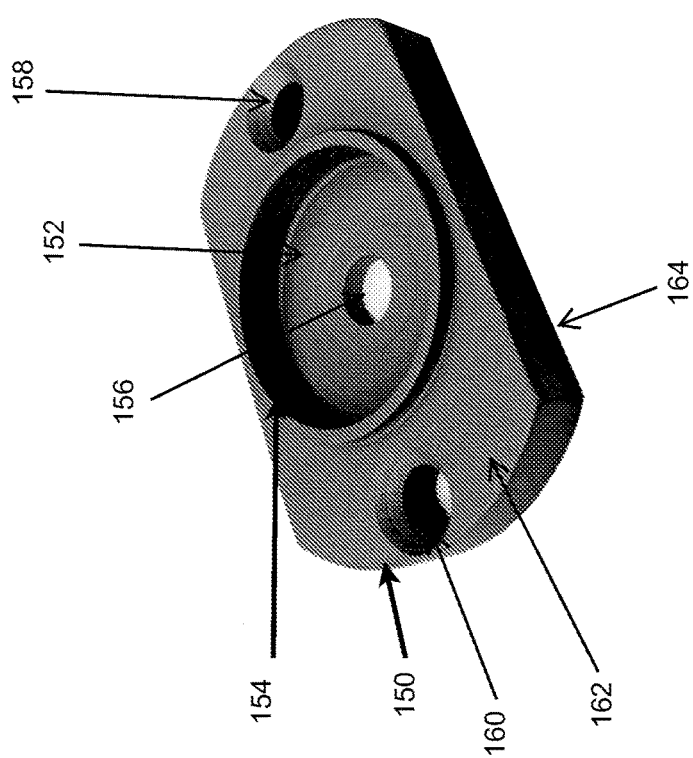
FIG. 15 is a top perspective view of a carrier in accordance with an embodiment of the invention.
Figure 18:
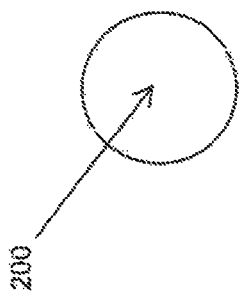
FIG. 18 is a top view of a magnet in accordance with an embodiment of the invention.
Figure 19:
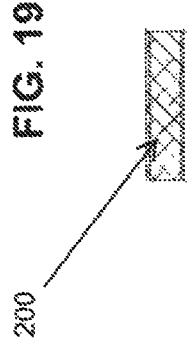
FIG. 19 is a side view of the magnet of FIG. 16.
Figure 16:
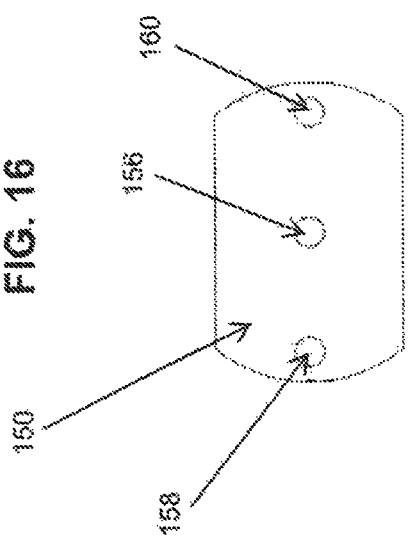
FIG. 16 is a bottom view of the carrier of FIG. 13.
Figure 17:
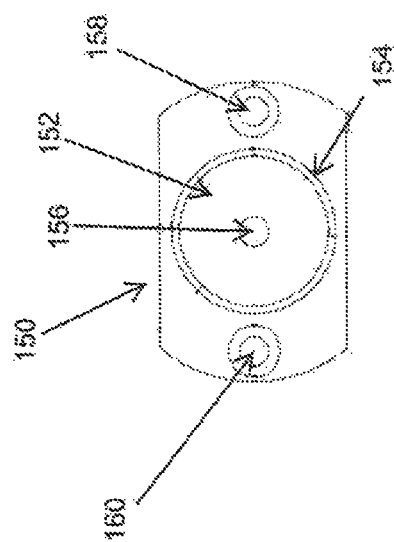
FIG. 17 is a top view of the carrier of FIG. 13.
Figures 20, 21:
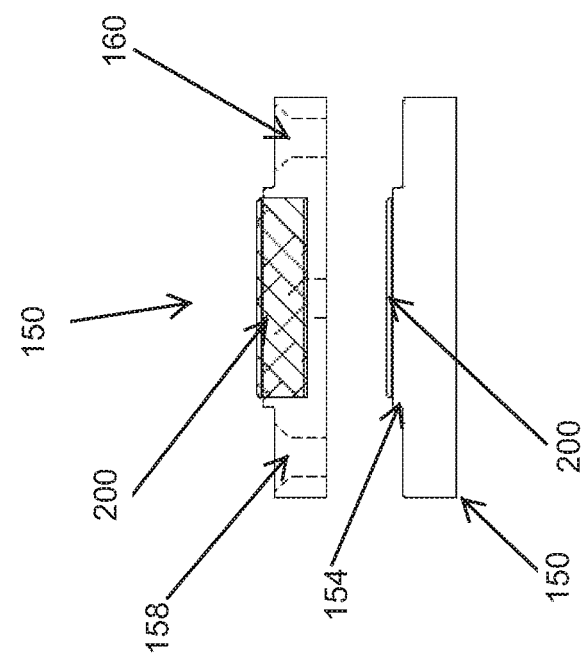
FIG. 20 is a cross-sectional view of a carrier and magnet in accordance with an embodiment of the inventions.
FIG. 21 is a side view of the carrier and magnet of FIG. 18.
Figure 22:
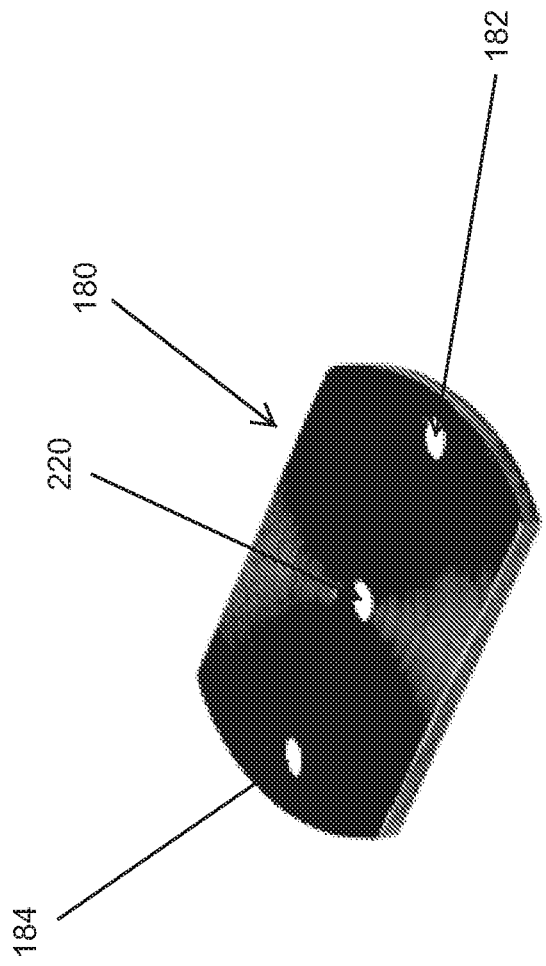
FIG. 22 is a top perspective view of a backing plate in accordance with an embodiment of the invention.
Figure 23:
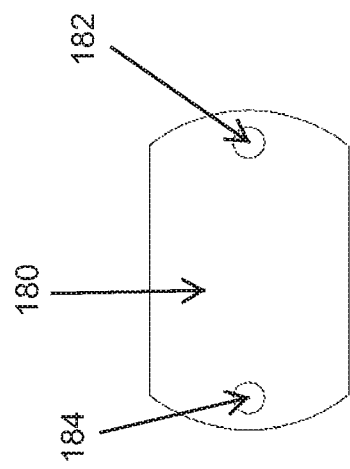
FIG. 23 is a top view of the backing plate of FIG. 20.
Figure 24:
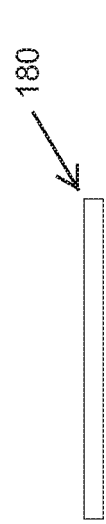
FIG. 24 is a side view of the backing plate of FIG. 20.
Figure 25:
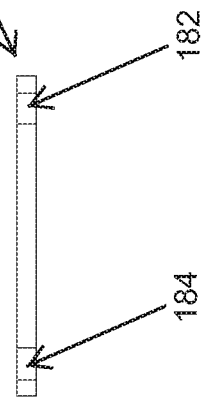
FIG. 25 is a cross-sectional view of the backing plate of FIG. 20.

According to another embodiment of the invention, the second magnet 28 may be disposed within a plastic housing 32, and the plastic housing can be attached to the desired mounting surface 29. As shown in FIGS. 5 and 6, the plastic housing 32 may include an upper hole 34 and a lower hole 38 for attaching the plastic housing 32 to the desired mounting surface 29 using screws or other attachment means. The mounting surface 29 may include, for example, the dashboard of a vehicle, a desk, or any other mounting location where radio microphones may be used. Thus, the user may attach the plastic housing 32 and associated second magnet 28 to any desired mounting surface 29, and the plastic housing 32 may be removed and utilized with a different radio microphone 20 and/or another mounting location. The upper hole 34 and/or lower hole 32 may also be elongated to allow for adjustment of the plastic housing 32 in an upward or downward direction when attaching the housing 32 to the mounting surface 29. As shown in FIG. 6, the second magnet 28 is preferably embedded within the outer surface 40 of the plastic housing 32 so that the attraction of the second magnet 28 is not diminished. Furthermore, the plastic housing 32 and/or second magnet 28 may also include the outer vinyl layer 30 to prevent breaking of the magnets 26 and 28 as described above.

While the plastic housing 32 is discussed above with respect to the second magnet 28, a similar plastic housing as described above may also be used to attach the first magnet 26 to the radio microphone 20.

In an alternative embodiment of the present invention, the radio microphone 20 does not include the first magnet 26. Instead of the first magnet 26, the rear side 24 of the radio microphone 20 has a metal body for attraction to the second magnet 28. Thus, a user only has to place the metal body of the radio microphone 20 near the second magnet 28 to replace the radio microphone 20 at the mounting location.

A radio microphone mounting system constructed in accordance with one embodiment of the present invention is shown in FIGS. 7-25 and generally designated 100. The system 100 generally includes a handset adapter 110 and a housing or mounting assembly supporting a magnet 200 including a carrier 150 and a backing plate 180. The radio microphone 300, clip 310 and mounting surface 320 are also illustrated in FIGS. 7-8. The mounting system 100 may be mounted to any suitable mounting surface 320, including vehicle dashboards and center consoles, as well as an outside surface of the radio, a desk or other work surface or a wall.

A handset adapter 110 is shown in FIGS. 9-14. The handset adapter 110 may include a slot 112 for receiving the hang up clip of a microphone, and a groove 114 for receiving the post connected to the hang up clip. The slot 112 and groove 114 may be sized to receive hang-up clips of various sizes and shapes, which may yield a universal after-market adapter 110. Optionally, the slot 112 may have a width of between approximately 0.5 and 1.0 inches, and further optionally approximately 0.77 inches. Optionally, the slot 112 may have a depth of between approximately 0.050 to 0.150 inches, and further optionally approximately 0.095 inches. Optionally the groove 114 may have a width of between approximately 0.1 and 0.5 inches, and further optionally approximately 0.375 inches.

The handset adapter 110 may include an aperture 116 that receives a securing element 117 for securing the handset adapter 110 to the hang-up clip after the clip is inserted into the slot 112. The securing element 117 may be any suitable element, including a hex-key-operated set screw threaded into the aperture 116. This type of fastener may allow quick and easy engagement and disengagement from the clip. As illustrated, the aperture 116 and set screw may be coaxially positioned relative to the handset adapter 110. Referring to FIG. 1, the hang up clip 116 may include a centrally-located inset dimple. The aperture 116 may be positioned to align with the inset dimple so that, when tightened, the set screw 117 (or other securing element) engages hang-up clip in the inset dimple. In addition to securing the adapter 110, the set screw 117 may also help to ensure sufficient electrical conductivity between the hang-up clip and the adapter 110 to allow the handset microphone to ground through the adapter 110 when hung-up on the mounting assembly. More specifically, tightening of set screw 117 may ensure there is sufficient engagement between the adapter 110 and the hang-up clip to provide electrical conductivity between the hang-up clip and the adapter 110. The handset adapter 110 may include a first surface 118 adapted to face the microphone and a second surface 120 adapted to face away from the microphone. The handset adapter 110 may be any of a variety of shapes, including a disk with a chamfered edge, as illustrated. The chamfered edge may facilitate a smoother engagement and disengagement of adapter 110 with the magnet 200, and may allow the user to roll the adapter 110 off of the magnet 200 for easier disengagement. In this embodiment, the handset adapter 110 may be a non-magnet. The handset adapter 110 may be made from any suitable material that is attracted by a magnet, including materials such as steel, iron, nickel and cobalt. Optionally, the handset adapter 110 may be 1018 carbon steel with a black oxide finish to prevent corrosion. A coating for the handset adapter 110 may also be electrically conductive, to promote grounding of the microphone, as discussed below. As used in this application, the terms "magnetic" and "magnetically permeable" each refer to a material that is attractable by a magnet. The terms "non-magnetic" and "non-magnetically permeable" each refer to a material that is not attractable by a magnet. The term "non-magnet" means not a magnet, but does allow for a material that is magnetic (e.g. attractable to a magnet). It should be noted that materials that are insufficient magnets, insufficiently magnetic, or insufficiently magnetically permeable to function in the desired manner described in this application are considered to be "non-magnets," "non-magnetic" and "non-magnetically permeable."

A carrier 150 is shown in FIGS. 15-21. The carrier 150 may include a void 152 for receiving the magnet 200. The magnet 200 may be attached to the carrier 150 using any suitable method, including a friction fit, adhesive and one or more fasteners. In a friction fit configuration, the void 152 may be made slightly smaller than the magnet 200, to allow for a press-fit insertion of the magnet 200. The void 152 may be any suitable size to receive the magnet 200 and may optionally be tapered with a larger diameter positioned closer to first surface 162 and a smaller diameter positioned closer to second surface 164. The magnet 200 may be any suitable size and shape, including disk shaped, as illustrated. The magnet may be made of any suitable magnet material, including neodymium and other alloys of rare earth elements. The carrier 150 may include an aperture 156 positioned coaxially with the void 152, and one or more countersunk apertures 158, 160 for receiving one or more mounting fasteners 224, 226. The carrier 150 may have a first surface 162 facing toward the microphone and a second surface 164 facing away from the microphone. The carrier 150 may be made from any suitable non-magnetic material, including aluminum with a flat black anodized finish to prevent corrosion. The carrier 150 may include a lip 154 for protecting a side surface of the magnet 200, and for setting a proper friction fit for the magnet 200. The carrier 150 may be electrically non-conductive.

A backing plate 180 is shown in FIGS. 22-25. The backing plate 180 may have one or more apertures 182, 184 for receiving one or more mounting fasteners 224, 226. As illustrated, the backing plate 180 may be sized and shaped to match the carrier 150. The backing plate 180 may be made from any suitable magnetic or magnetically permeable material, such as 1018 carbon steel with a black oxide finish to prevent corrosion.

To assemble the radio microphone mounting system 100, the handset adapter 110, carrier 150, backing plate 180 and magnet 200 are all formed using suitable processes, including machining, punching and forging. The handset adapter 110 is slid onto the hang-up clip for the microphone, and the securing element is tightened against the clip. If an existing conventional hang-up clip mount for a radio microphone is currently installed on a mounting surface (on the dash of a vehicle for example), the currently-installed mount may be removed. The apertures 158, 160, 182, 184 for receiving mounting fasteners 224, 226 may be positioned so that they match the existing holes for the conventional hang-up clip mount and allow for an easier retrofit. The carrier 150 may be placed on top of the backing plate 180, and the mounting fasteners 224, 226 may be secured through the apertures 158, 160, 182, 184 to mount the carrier 150 and backing plate 180 to the mounting surface. If a friction fit is used, the magnet 200 may be press-fitted into the void 152 in the carrier 150 opposite the backing plate 180.

The materials and the configuration of the radio microphone mounting system 100 may provide certain benefits with regard to the magnetic field produced. The magnet 200 may be axially polarized. An axially polarized magnet may provide a broader and more consistent "landing zone" for the handset adapter 110 than a magnet that is diametrically polarized. As a result, the landing zone produced by an axially-polarized magnet may be more useful when the user must connect the handset adapter 110 and the magnet 200 based on feel and without looking at either object. In this manner, the user may attach the handset adapter 110 and the magnet 200 by bringing the handset adapter 110 in the general vicinity of the magnet 200.

As discussed, the carrier 150 may be made of a non-magnetic material, which does not communicate the magnetic field across the carrier 150. As a result, the magnetic field may remain focused on the magnet 200, which has sufficient magnetic attraction to support the microphone. If the carrier 150 were magnetic, the adapter 110 may be slightly attracted to the carrier 150, which may lead to misplacement of the adapter 110 partially or completely off of the magnet 200. Misplacement of the adapter 110 may especially occur with a magnetic carrier 150 when the user is placing the adapter 110 based on feel alone, and without visual assistance. This may lead to the microphone and adapter 110 becoming unintentionally disengaged from the magnet 200 and carrier 150, while driving a vehicle, for example.

The backing plate 180 may be magnetic or magnetically permeable, and may isolate the magnetic field from the environment surrounding the radio microphone mounting system 100 to provide a consistent magnetic force between the handset adapter 110 and the magnet 200. Otherwise, the environment surrounding the radio microphone mounting system 100 may increase or decrease the strength of the magnetic field. For example, if the dashboard or console where the microphone may be mounted is made from a magnetic material, then the strength of the magnetic field may be increased if a non-magnetic backing plate 180 were not included.

The sizes of the magnet 200, the carrier 150 and the backing plate 180 may provide a desired pull force to remove the handset adapter 110 from the magnet 200. Optionally, the pull force may be between approximately 20-30 pounds, and further optionally approximately 25 pounds. Optionally, the magnet 200 may have a diameter between approximately 0.5 inches and 1.5 inches, and further optionally approximately 1.0 inch. Optionally, the magnet 200 may have a thickness of approximately 0.1 inches to 0.4 inches, and further optionally approximately 0.25 inches. Optionally, in the region of the lip 154, the carrier 150 may have a thickness between approximately 0.1 and 0.6 inches, and further optionally approximately 0.3125 inches. Optionally in the region without the lip 154, the carrier 150 may have a thickness between approximately 0.1 and 0.5 inches, and further optionally approximately 0.2625 inches. Optionally, the backing plate 180 may have a thickness between approximately 0.05 and 0.2 inches, and further optionally approximately 0.125 inches.

Figure 26:
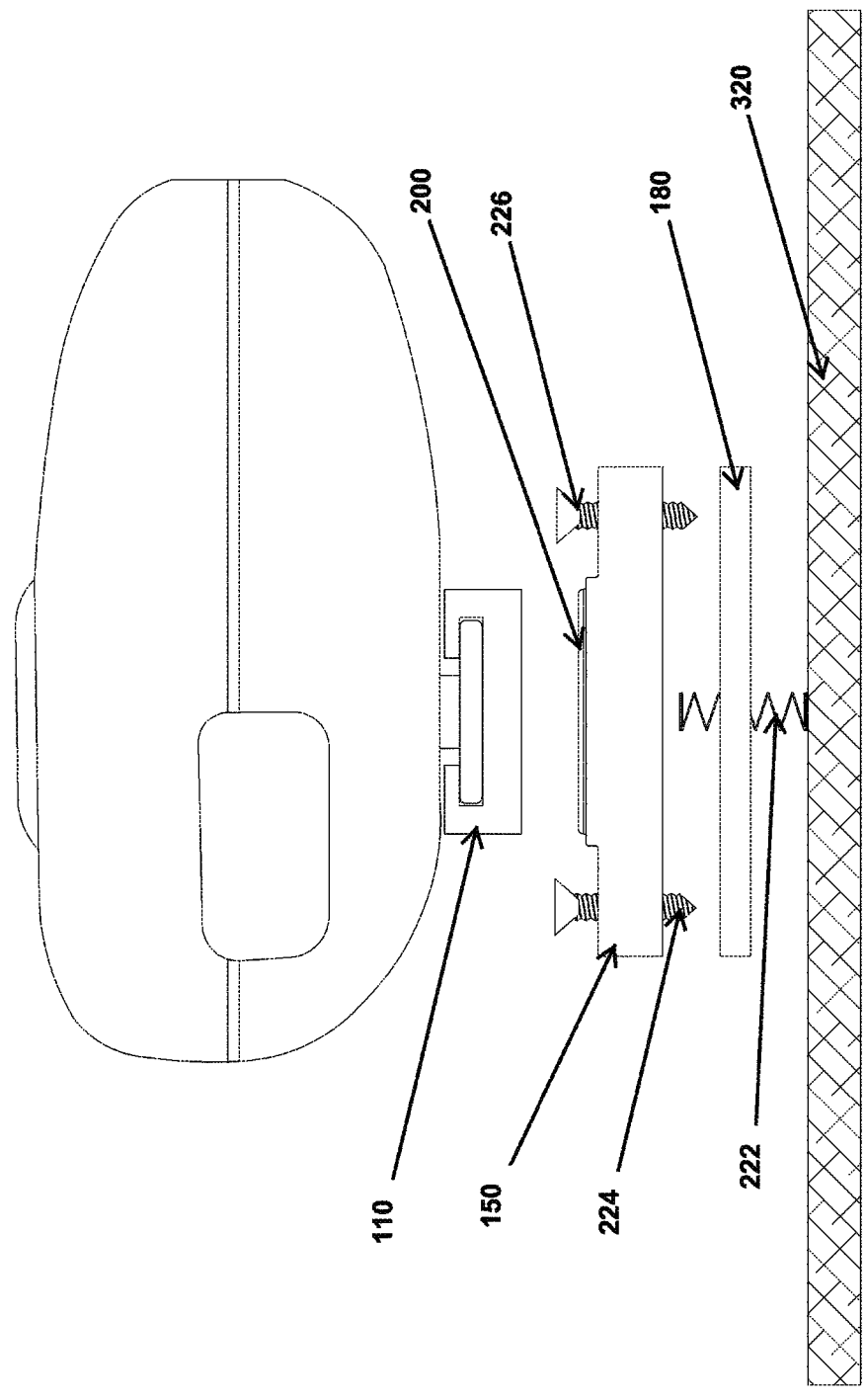
FIG. 26 is a side exploded view of a grounding path.
Figure 27:
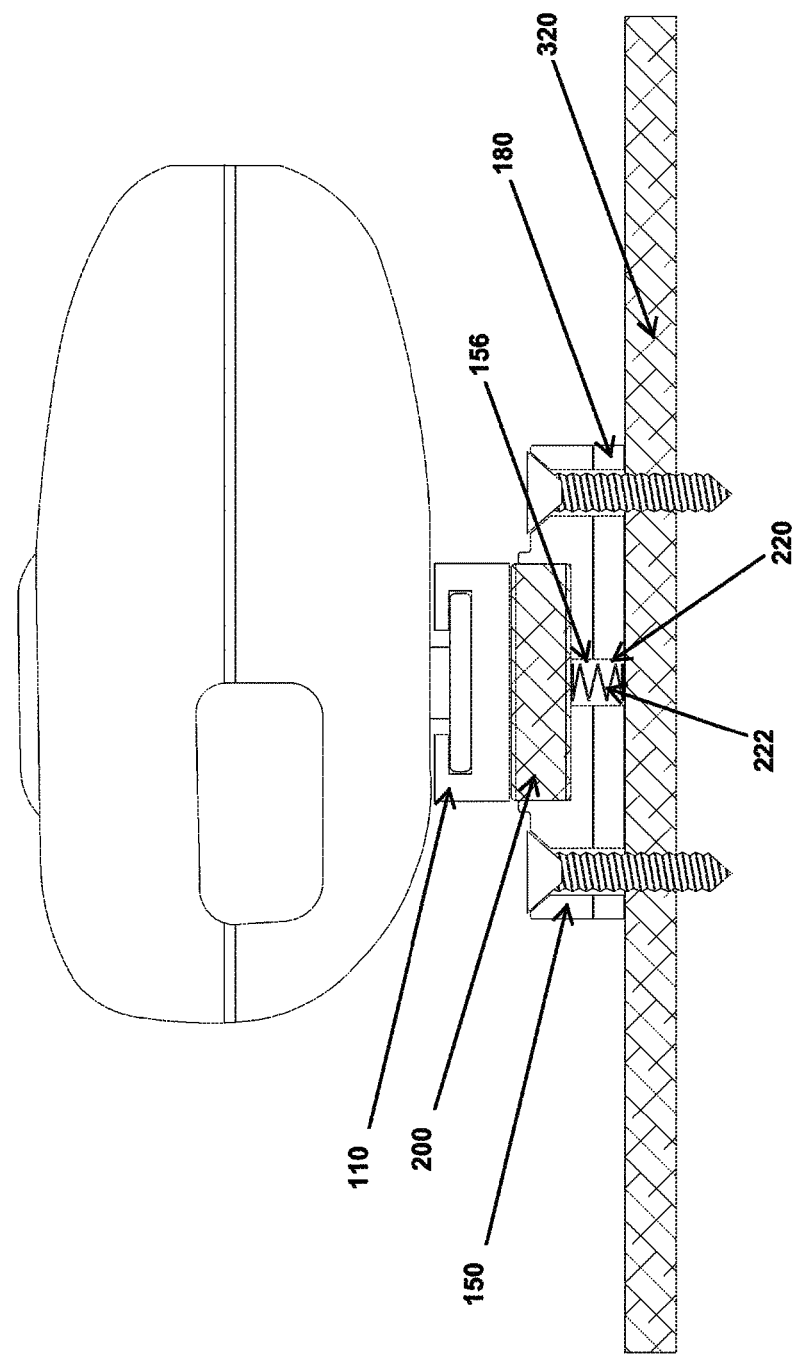
FIG. 27 is a sectional view of the grounding path of FIG. 26.

The radio microphone mounting system 100 may also provide benefits with regard to grounding the microphone. In uses such as in emergency vehicles, a scanner is typically audible to the emergency personnel. However, when a user wishes to use the microphone, it is desirable that the scanner be muted or otherwise turned off. This may be accomplished by the microphone being grounded while it is mounted, and ungrounded when it is removed from the mount by the user. Accordingly, if the radio system is grounded, the system may allow the scanner to be at full volume, and when the radio system is ungrounded, the scanner may be automatically placed at a reduced or muted volume. In the radio microphone mounting system 100, an integral grounding path is configured to allow the radio system to ground when the handset adapter 110 and magnet 200 are connected. One embodiment of an integral grounding path is shown in FIGS. 26-27. The integral grounding path includes one or more conductive elements 222 extending between the magnet 200 and a potential ground 320. For example, the dashboard or center console could serve as a potential ground, if either are grounded. As illustrated, the grounding path may include apertures 156, 220 extending from the magnet 200 through the carrier 150 and the backing plate 180. An electrically conductive element 222 may be positioned within the aperture 220 and may contact the magnet 200 and the potential ground 320. It should be noted that, if the dashboard or center console are not grounded, a potential ground may be created by attaching an electrical wire between the conductive element 222 and another grounded element of the vehicle. The electrically conductive element 222 may be any suitable element, including an electrically conductive spring. One or more fasteners 224, 226 may be inserted through the apertures 158, 160, 182, 184 to secure the assembly.

Figure 28:
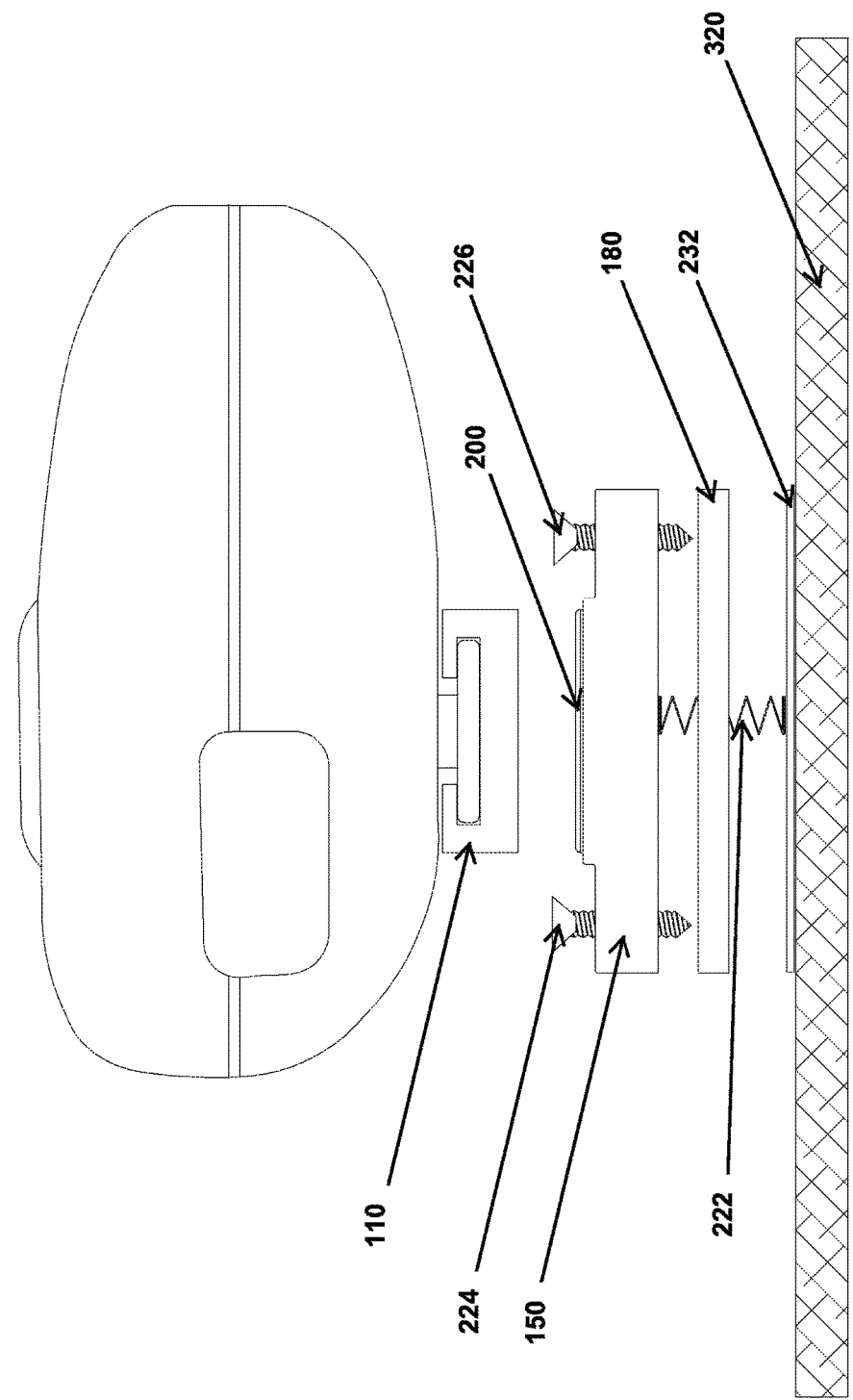
FIG. 28 is a side exploded view of a grounding path.
Figure 29:
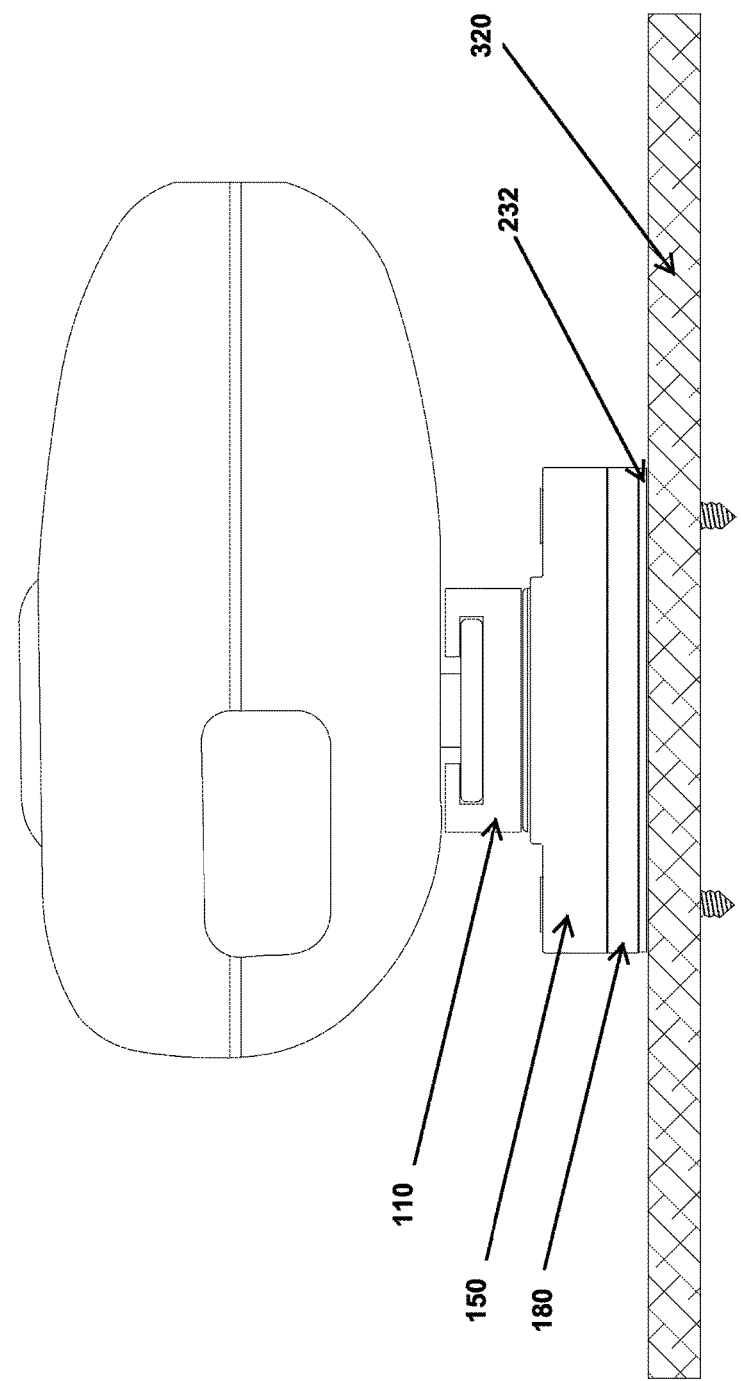
FIG. 29 is a side view of the grounding path of FIG. 28.
Figure 30:
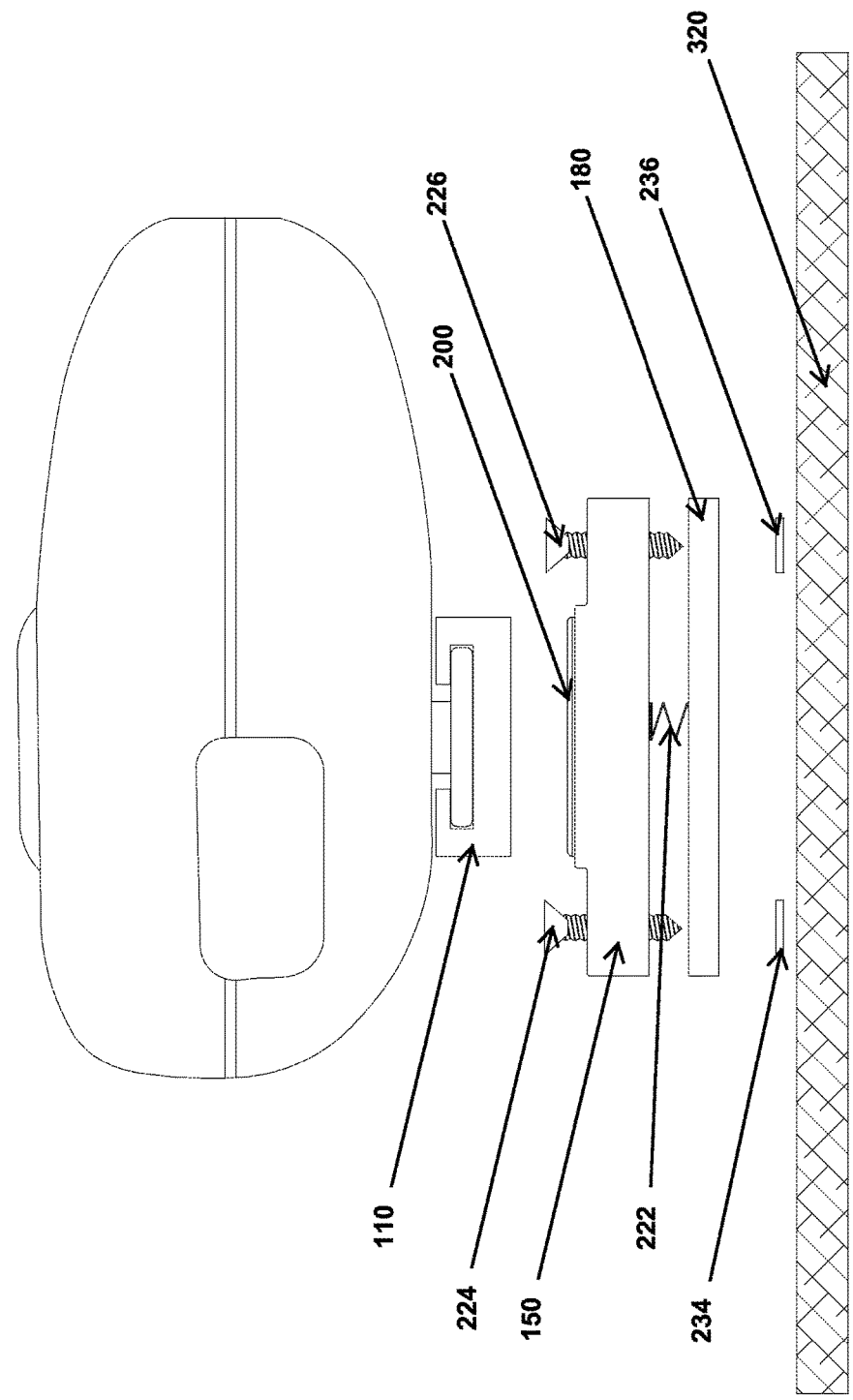
FIG. 30 is a side exploded view of a grounding path.
Figure 31:
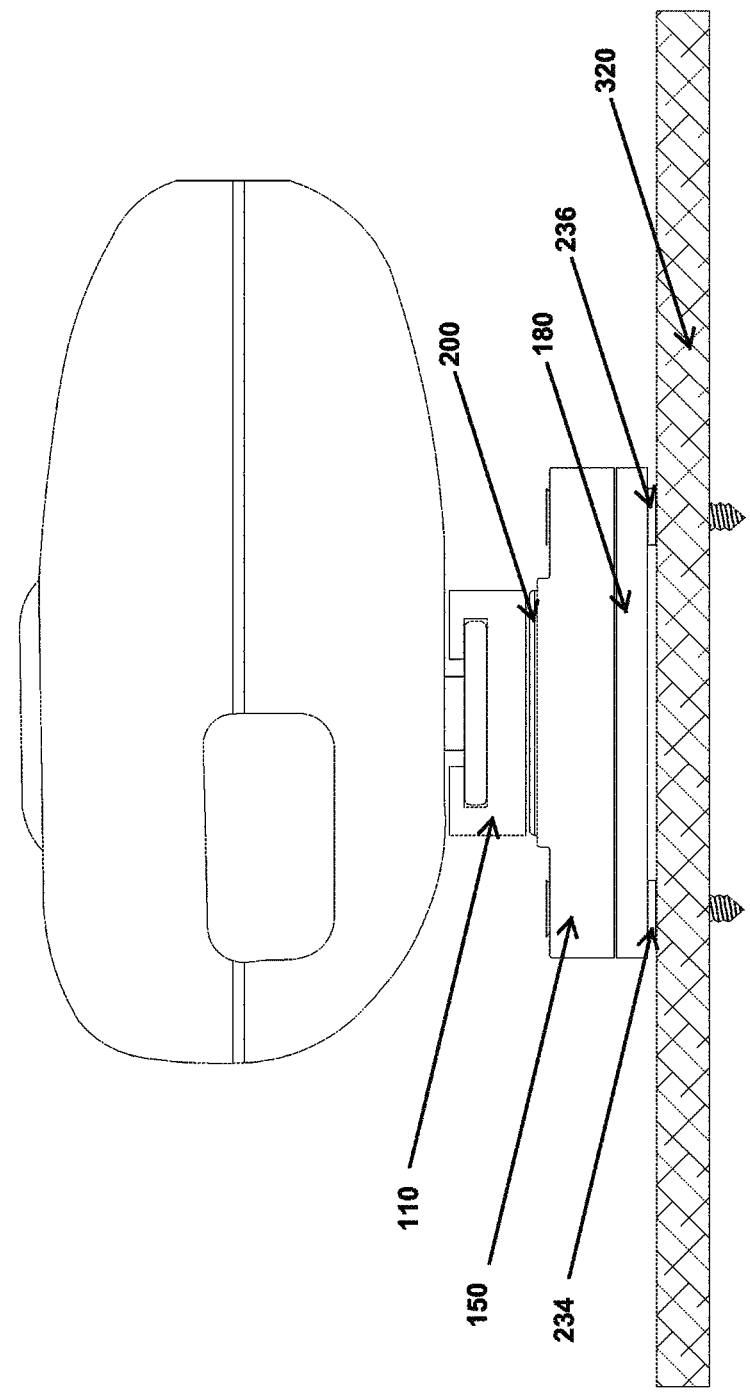
FIG. 31 is a side view of the grounding path of FIG. 30.

Another embodiment of an integral grounding path is shown in FIGS. 28-29. This configuration is similar to the embodiment in FIGS. 26-27, except that a second electrically conductive element 232 is positioned between the backing plate 180 and the mounting surface 320. The second conductive element 232 may be positioned so that the conductive element 222 contacts the second conductive element 232, and so that one or both of the fasteners 224, 226 bite into the second conductive element 232 while mounting the carrier 150 and backing plate 180. The second conductive element 232 may be any suitable conductive element, including a strip of conductive material. In this configuration, the conductive element 222 may conduct between the magnet 200 and the second electrically conductive element 232, and the fasteners 224, 226 may conduct between the second electrically conductive element 232 and the potential ground 320.

In a variation of the embodiment of FIGS. 28-29, the second electrically conductive element 232 may be positioned between the carrier 150 and the backing plate 180. In this manner, the aperture 220 through the backing plate 180 may be eliminated. In this variation, the conductive element 222 may conduct between the magnet 200 and the second electrically conductive element 232, and the fasteners 224, 226 may conduct between the second electrically conductive element 232 and the potential ground 320. In yet another variation shown in FIGS. 30-33, the second conductive element 232 and aperture 220 may be eliminated, and one or more toothed washers 234, 236 may be positioned between the backing plate 180 and mounting surface 320. During installation of one or both fasteners 224, 226, the washers 234, 236 may engage the fasteners 224, 226 and may also bite into or otherwise contact the backing plate 180. In this configuration, the conductive element 222 may conduct between the magnet 200 and the backing plate 180, the toothed washers 234, 236 may conduct between the backing plate 180 and the fasteners 224, 226, and the fasteners 224, 226 may conduct between the toothed washers 234, 236 and the potential ground 320. This variation may be especially useful if the material in the backing plate 180 is too hard for the fasteners 224, 226 to bite into during installation.

Figure 35:
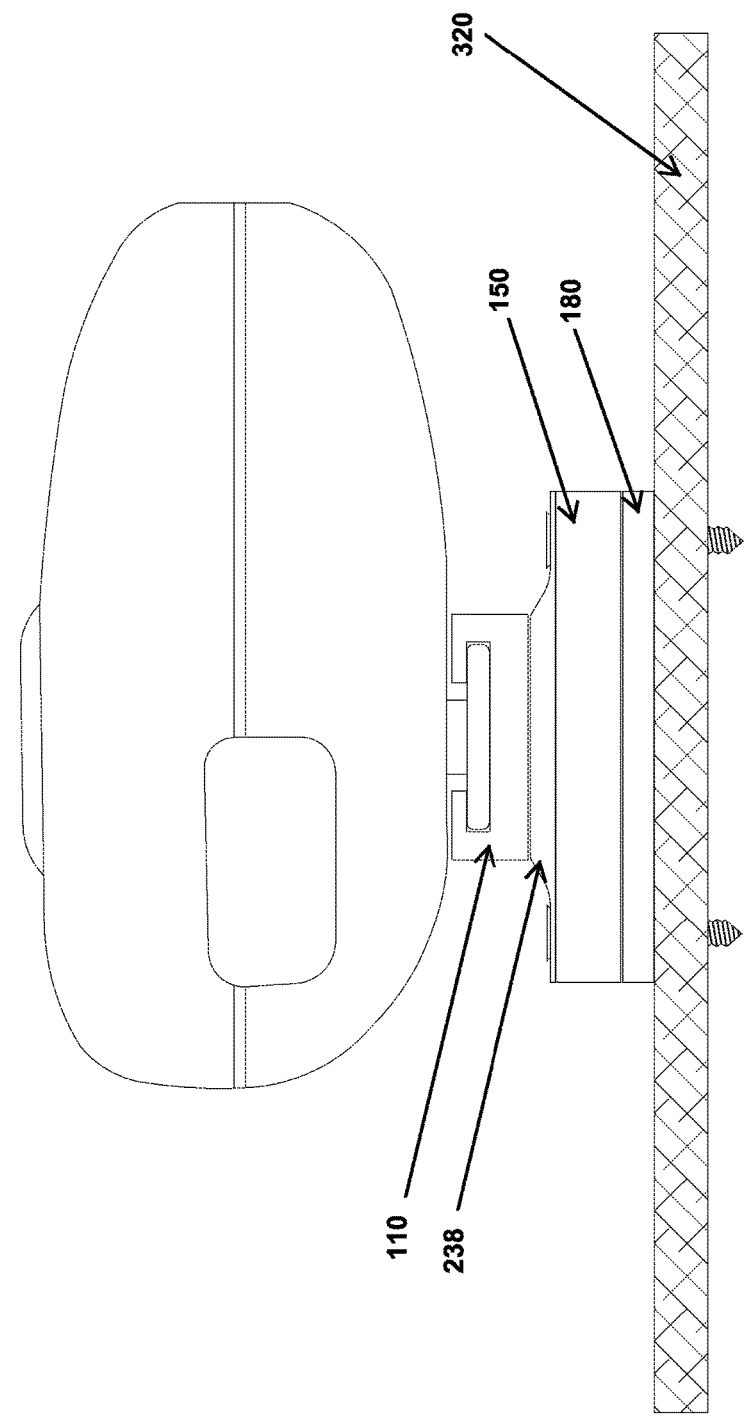
FIG. 35 is a side view of the grounding path of FIG. 34.
Figure 36:
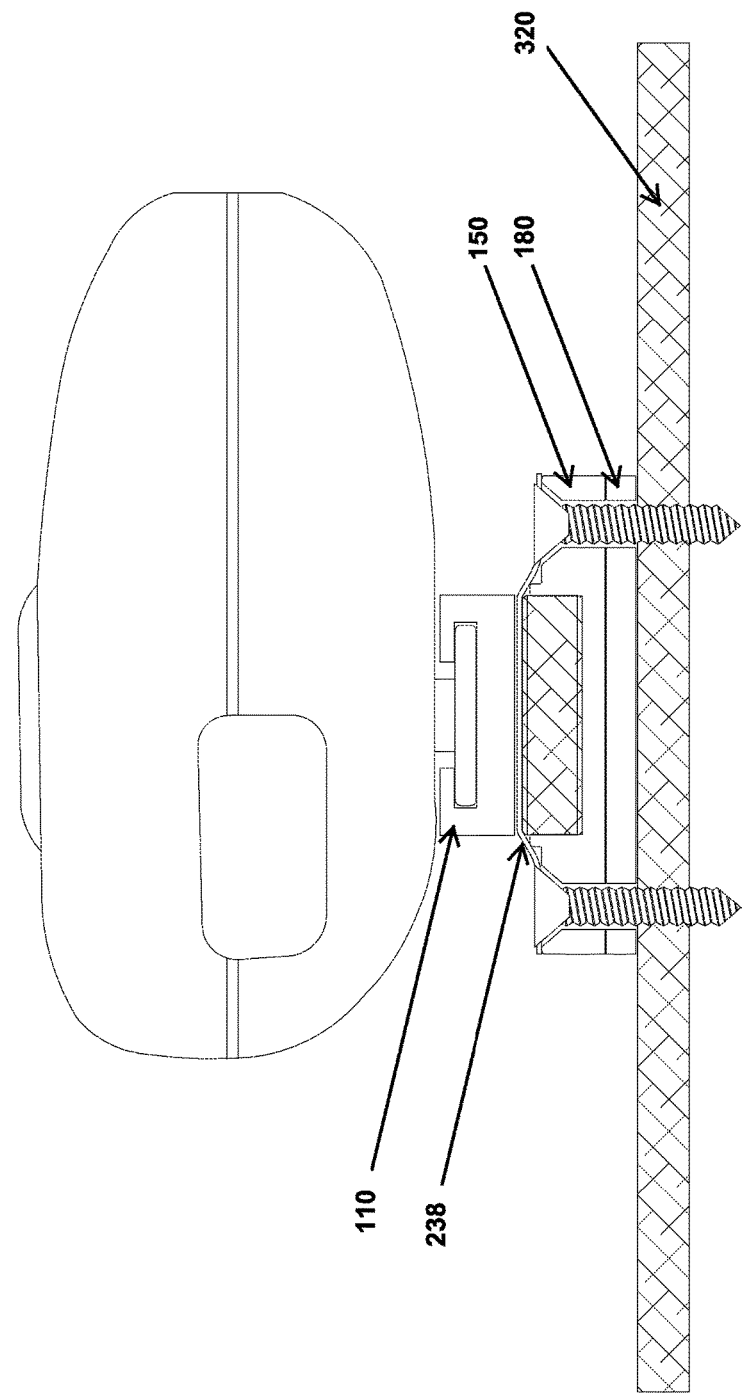
FIG. 36 is a sectional view of the grounding path of FIG. 34.

In another embodiment, the carrier 150 may be coated with an electrically conductive coating, and one or more fasteners 224, 226 may be inserted through the apertures 158, 160, 182, 184 and into a potential ground 320. The one or more fasteners 224, 226 may bite into or otherwise contact the electrically conductive coating and the potential ground 320. In this configuration, the coating may conduct between the magnet 200 and the fasteners 224, 226, and the fasteners 224, 226 may conduct between the coating and the potential ground 320. Optionally, the electrically conductive coating may also be non-magnetic and sufficiently thin so as not to interrupt the magnetic field created by the assembly. The coating may be applied to the carrier 150 via any suitable process, including spraying and adhering. Optionally, the coating may be a separate element secured to the carrier 150 by one or both fasteners 224, 226. For example, the coating may be a plate 238 secured to the carrier 150 as shown in FIGS. 34-36. The coating may be any suitable material, including stainless steel.

In another embodiment, the carrier 150 may be conductive, but not magnetic. For example, uncoated aluminum may be used for the carrier 150. In this configuration, the fasteners 224, 226 would bite into or otherwise contact the carrier 150 so that the carrier 150 conducts from the magnet 200 to the fasteners 224, 226, and the fasteners 224, 226 conduct from the carrier 150 to the potential ground 320.

Figure 37:
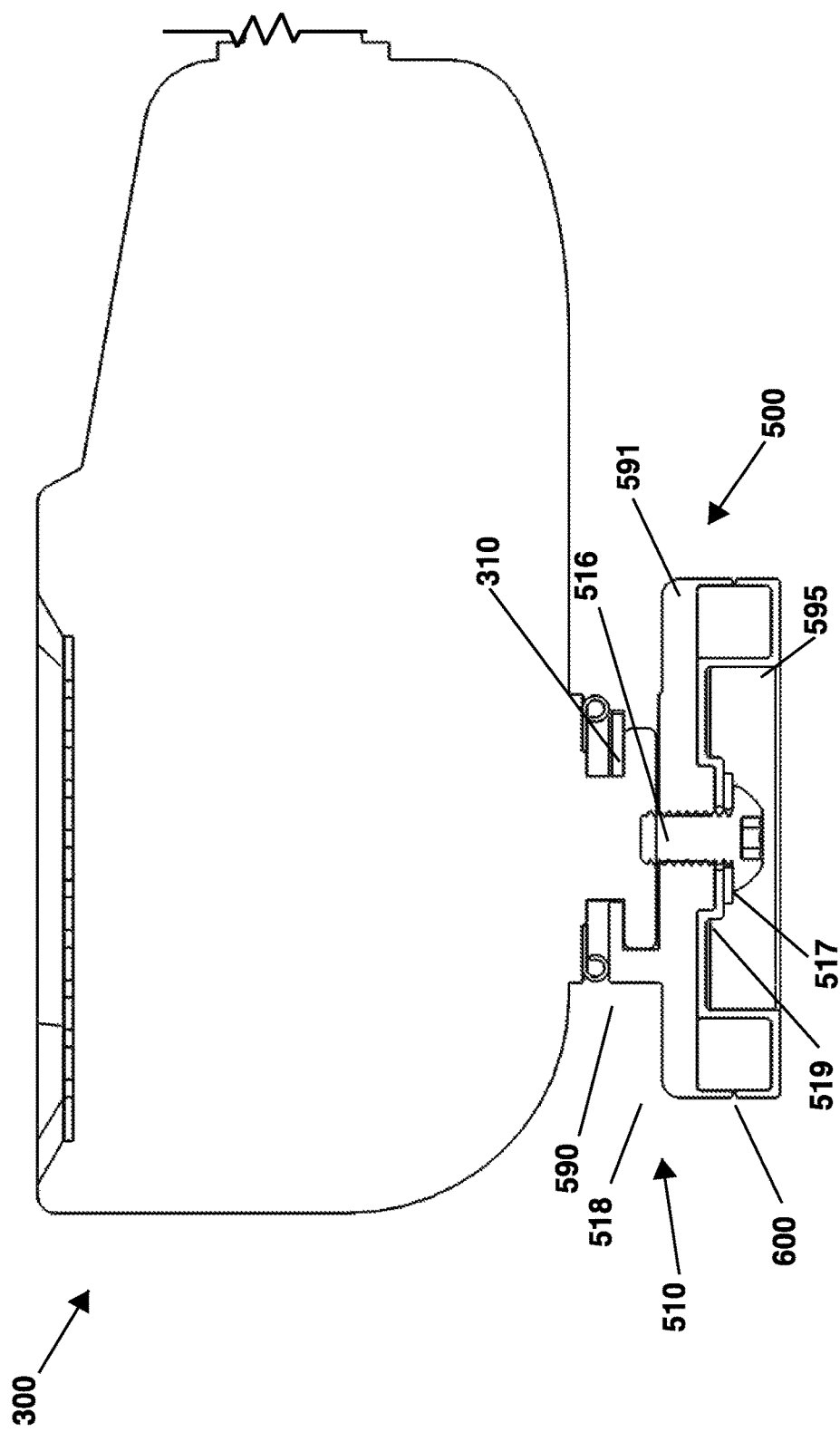
FIG. 37 is a side view of a radio microphone mounting system constructed in accordance with an embodiment of the present invention.
Figure 38:
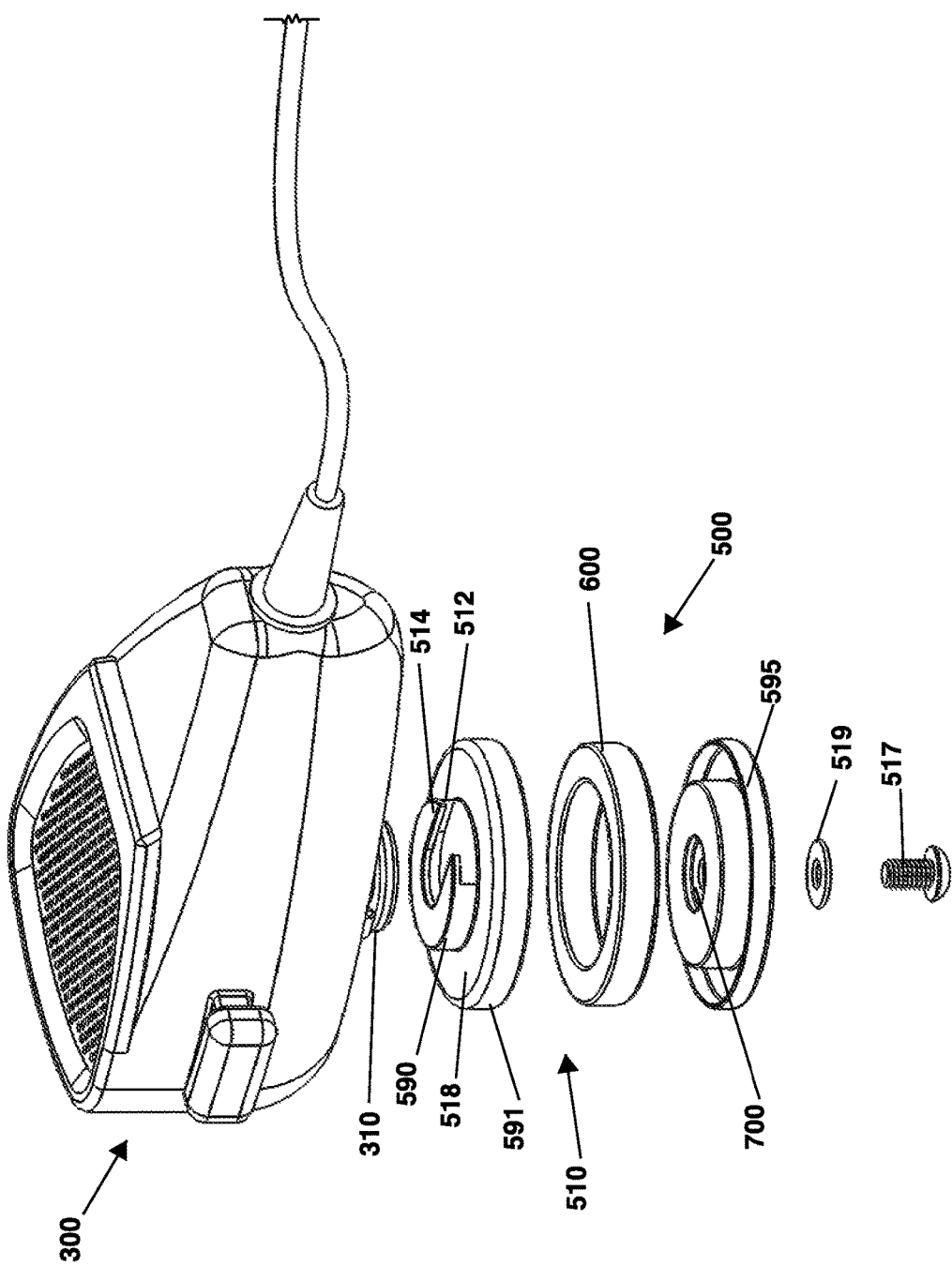
FIG. 38 is a partially exploded view of the radio microphone mounting system of FIG. 37.
Figure 39:
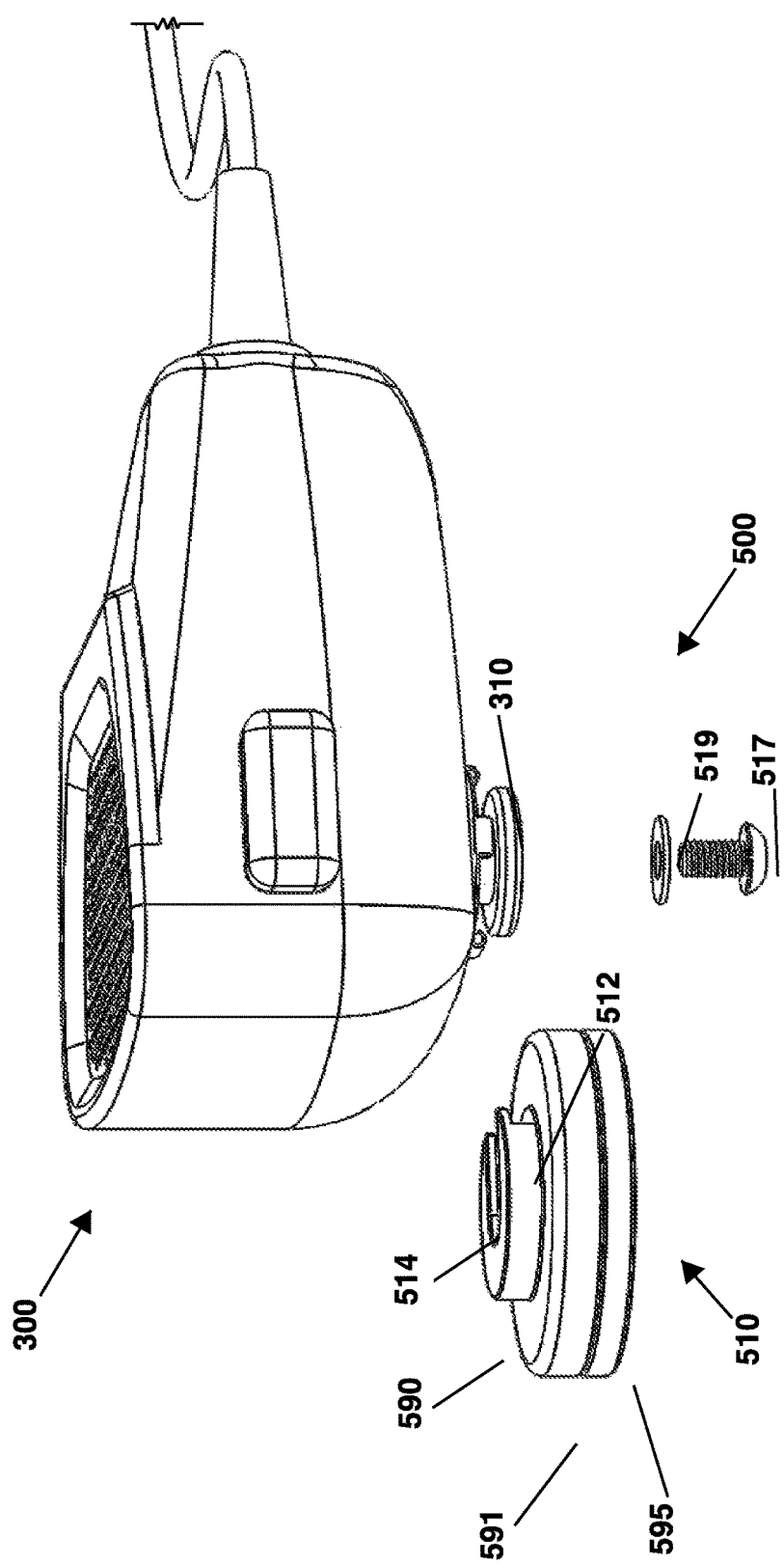
FIG. 39 is a partially exploded view of the radio microphone mounting system of FIG. 37.

FIGS. 37-39 illustrate another exemplary radio microphone mounting system 500 that is similar to the mounting system 100 except for the manner in which the handset adapter and magnet are used to mount the radio microphone 300. Therefore, part numbers of elements of the mounting system 500 similar to those of the mounting system 100 are labeled with part numbers similar to the mounting system 100 increased by 400.

Referring now to FIGS. 37-38, the mounting system 500 generally includes a handset adapter 510 that is mounted onto the hang up clip 310 of the radio microphone 300 to mount a magnet 600 to the microphone 300. The handset adapter 510 can include an aperture 516 extending coaxially through the handset adapter 510, which is configured to receive a set screw 517 and optional washer 519 for securing the handset adapter 510 to the hang up clip 310. The handset adapter 510 further includes a disk portion 590 having a slot 512 and a groove 514 similar to that described above for the handset adapter 110 of FIGS. 7-10 for mounting to the hang up clip 310 in a manner similar to that described above for the handset adapter 110. The handset adapter 510 can be made from any suitable material, non-limiting examples of which include a polymeric material or a metal alloy.

The magnet 600 can be secured to an exterior surface of the handset adapter 510 opposite an interior surface facing the microphone 300 using any known mechanical or non-mechanical fasteners or combinations thereof. In one example, the magnet 600 can be secured to the exterior surface of the handset adapter 510 using an adhesive. In another example, the magnet 600 can be secured to the handset adapter 510 using a mechanical fastener, such as a set screw, a clamp, or a clip.

In the example illustrated in FIGS. 37-38, the handset adapter 510 can include a housing 591 for mounting the magnet 600 to the handset adapter 510. As illustrated in FIGS. 37-38, the housing 591 can include a cavity within which the magnet 600 is inserted. The housing 591 can include a lip that at least partially covers a side surface of the magnet 600 for protecting the magnet 600. The magnet 600 can optionally be secured within the cavity of the housing 591 through a friction fit configuration, an adhesive, a mechanical fastener, or a combination thereof. In one example, the magnet 600 can be ring shaped such that the set screw 517 passes through the magnet 600 for securing the handset adapter 510 to the hang up clip 300. In another example, the housing 591 does not include a cavity and the magnet 600 is mounted to a face of the housing 591 using an adhesive, a mechanical fastener, or a combination thereof.

The handset adapter 510 can optionally include an adapter cover 595 configured to protect the magnet 600 and/or facilitate securing the magnet 600 to the handset adapter 510. The adapter cover 595 can be made from a polymeric material that provides cushioning and/or shock absorption to the magnet 600 to minimize damage to the magnet 600 during use. The adapter cover 595 can be secured to the handset adapter 510 in any suitable manner. In the example illustrated in FIG. 38, the adapter cover 595 can include an aperture 700 configured to receive the set screw 517 for securing the adapter cover 595 to the handset adapter 510. Optionally, the adapter cover 595 can be made of an elastic polymeric or rubber material such that the adapter cover 595 can be stretched to fit around the magnet 600 and the housing 591 to secure the magnet 600 within the housing 591 through a frictional fit. In another optional embodiment, the adapter cover 595 can be configured to surround a perimeter of the housing 591 and include a lip that snap-fits around an interior surface 518 of the handset adapter 510 that faces the microphone 300. In yet another example, when the housing 591 includes a lip defining a cavity into which the magnet 600 is inserted, the adapter cover 595 can include a lip that snap-fits within the housing lip.

FIG. 39 illustrates a manner in which the handset adapter 510 can be mounted to the microphone 300. The handset adapter 510 can be assembled with the magnet 600 positioned between the housing 591 and the adapter cover 595 prior to or subsequent to sliding the disk portion 590 onto the hang up clip 310 in a manner similar to that described above for the handset adapter 110 of FIGS. 7-10. When the handset adapter 510 and magnet 600 are in place relative to the radio microphone 300, the washer 519 can be positioned adjacent the adapter cover 595 and the set screw 517 can be threaded through the aperture 700 in the adapter cover 595, through the center of the ring shaped magnet 600, and through the aperture 516 to press against the hang up clip 310 to secure the handset adapter 510 to the microphone 300.

In this manner, the assembled handset adapter 510 provides the microphone 300 with a magnet 600 that can be used to mount the microphone 300 to a suitable magnetic or magnetically attractable surface. As discussed above with respect to the mounting system 100, the strength and optional polarity of the magnet 600 can be selected to provide the desired amount of attraction between the magnet 600 and whatever surface the microphone 300 is to be mounted to. The desired amount of magnetic strength can be based on the amount of strength required to securely mount the microphone 300 to a mounting surface while also allowing a user to easily mount and remove the microphone 300 during use.

In one example, the handset adapter 510 can be used to mount the microphone to a magnet secured to a mounting surface by the housing 32 of FIGS. 5 and 6 or the carrier 150 of FIGS. 7-10. In another example, the handset adapter 510 can be used to mount the microphone 300 to a magnetically attractable surface provided in the mounting area, such as a metal frame within the vehicle or adjacent work surface. In still another example, the housing 32 and carrier 150 described above can be used to mount a magnetically attractable material instead of a magnet for magnetically attracting the magnet 600 of the handset adapter 510.

Alternatively, rather than mounting a magnet to the microphone 300, the handset adapter 510 can be used to mount a non-magnet that includes a magnetically attractable material to the microphone instead of the magnet 600. In this manner the handset adapter 510 can be used to mount the microphone 300 to a magnet in a manner similar to that described above with respect to the handset adapter 110 of FIGS. 7-10. For example, the housing 591 can be used to mount a magnetically attractable material in a manner similar to which the magnet 600 is mounted to the housing 591. In this alternative example, the disk portion 590 can be made from a non-magnet material. In another example, the housing 591 can be made from a magnetically attractable material for direct interaction with a magnet provided on the mounting surface. In these examples, the handset adapter 510 can then be used to mount the microphone 300 to a mounting surface using the housing 32 of FIGS. 5 and 6 or the carrier 150 of FIGS. 7-10 which support a magnet on a mounting surface in a manner similar to that described above.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. For example, elements of the microphone mounting systems 100 and 500 can be used interchangeable or in combination with each other as desired. Elements of one or more of the mounting systems 100 and 500 can be mixed and matched as desired to form new embodiments, whether or not the new embodiments are expressly disclosed, and used in combination with any of the mounting surfaces, housings, or carriers described herein. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Elements of any embodiment may be used in combination with elements of other embodiments. Any reference to claim elements in the singular, for example, using the articles "a," "an," "the" or "said," is not to be construed as limiting the element to the singular.

What is claimed is:

1. A conversion kit for a radio handset microphone having a mechanical mounting system, the conversion kit capable of converting the mechanical mounting system to a magnetic mounting system comprising:
   a magnetic handset adapter configured to attach directly to a pre-existing mechanical hang-up clip of the radio handset microphone, the pre-existing mechanical hang-up clip being on an exterior of and extending from the radio handset microphone, the hang-up clip having a post and a tongue extending from the post disposed on the exterior of the radio handset microphone, the magnetic handset adapter including a slot and a groove, the slot configured to slide onto the tongue of the mechanical hang-up clip and the groove configured to receive the post without any disassembly of the handset microphone, the magnetic handset adapter including a magnet and being an extension of the mechanical hang-up clip when attached to the mechanical hang-up clip, the magnetic handset adapter and the magnet being disposed on the exterior of the radio handset microphone when attached the pre-existing mechanical hang-up clip;
   whereby the magnetic handset adapter is configured to mount the radio handset microphone to a mounting surface via the mechanical hang-up clip through a magnetic attraction associated with the magnet, the magnetic handset adapter and the magnet configured to remain attached to the mechanical hang-up clip of the radio handset microphone as the radio handset microphone is mounted to and removed from a mounting surface.

2. The conversion kit of claim 1 wherein the magnetic handset adapter includes a generally circular disk defining the slot and the groove.

3. The conversion kit of claim 2 wherein the handset adapter magnet is disposed on a side of the adapter opposite the slot and groove for magnetically mounting the handset microphone to the mounting surface.

4. The conversion kit of claim 3 wherein the magnet is ring shaped.

5. The conversion kit of claim 3 wherein the magnetic handset adapter includes a set screw for securing the magnetic handset adapter to the hang-up clip.

6. The conversion kit of claim 5 wherein the set screw is positioned coaxially with respect to the magnetic handset adapter.

7. The conversion kit of claim 3 wherein the magnetic handset adapter further includes a housing having a cavity, with the magnet at least one of frictionally secured or adhesively secured within the cavity.

8. The conversion kit of claim 3, further comprising an adapter cover disposed over the magnet for at least one of covering or securing the magnet to the magnetic handset adapter.

9. The conversion kit of claim 8 wherein the adaptor cover is secured to the magnetic handset adapter by at least one of a friction fit, a set screw, or an adhesive.

10. The conversion kit of claim 8 wherein the adaptor cover comprises a polymeric material.

11. The conversion kit of claim 1 wherein the slot and groove are sized to fit a plurality of hang-up clip sizes.

12. A conversion kit for a radio handset microphone having a mechanical mounting system, the conversion kit capable of converting the mechanical mounting system to a magnetic mounting system comprising:
   a magnetic handset adapter configured to attach directly to a pre-existing mechanical hang-up clip, the hang-up clip having a post and a tongue extending from the post disposed on the exterior of the radio handset microphone, the magnetic handset adapter including a slot and a groove, the slot configured to slide onto the tongue of the mechanical hang-up clip and the groove configured to receive the post without any disassembly of the handset microphone, the magnetic handset adapter being an extension of the mechanical hang-up clip when attached to the mechanical hang-up clip; and
   a housing supporting a magnet capable of attracting the magnetic handset adapter, the housing configured to attach to a mounting surface,
   whereby the magnetic handset adapter is configured to mount the radio handset microphone to a mounting surface via the mechanical hang-up clip through a magnetic attraction between the magnetic handset adapter and the magnet supported by the housing, the magnetic handset adapter being removable from the mounting surface by separating the magnetic handset adapter from the magnet while the magnetic handset adapter remains attached to the mechanical hang-up clip and the housing remains attached to a mounting surface.

13. The conversion kit of claim 12 wherein the magnetic handset adapter includes a generally circular disk defining the slot and the groove.

14. The conversion kit of claim 12 wherein the magnetic handset adapter includes a set screw for securing the magnetic handset adapter to the hang-up clip.

15. The conversion kit of claim 12 wherein the magnet is secured to the housing with a friction fit.

16. The conversion kit of claim 12 wherein the magnet is axially polarized.

17. The conversion kit of claim 12 wherein the magnetic handset adapter further comprises a magnet disposed on a side of the adapter opposite the slot and groove for magnetically mounting the handset microphone to the magnet attached to the mounting surface.

\* \* \* \* \*